United States Patent
Yamamoto et al.

(10) Patent No.: US 6,293,095 B1
(45) Date of Patent: Sep. 25, 2001

(54) IN-CYLINDER INJECTION TYPE INTERNAL COMBUSTION ENGINE

(75) Inventors: Shigeo Yamamoto, Obu; Kazuyoshi Nakane; Hironobu Sato, both of Okazaki; Jun Takemura, Toyota; Hiromitsu Ando; Takashi Dogahara, both of Okazaki; Kinichi Iwachido, Aichi-gun, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/249,315

(22) Filed: Feb. 12, 1999

(30) Foreign Application Priority Data

Feb. 13, 1998 (JP) .................................................. 10-031211
Sep. 25, 1998 (JP) .................................................. 10-272087

(51) Int. Cl.$^7$ ...................................................... F01N 3/00
(52) U.S. Cl. .............................. 60/286; 60/284; 60/282; 60/272; 60/274
(58) Field of Search ............................. 60/282, 272, 286, 60/284, 274

(56) References Cited

U.S. PATENT DOCUMENTS

| | | | |
|---|---|---|---|
| 4,104,881 | 8/1978 | Kogure et al. . | |
| 5,207,058 | 5/1993 | Sasaki et al. . | |
| 5,479,775 | * | 1/1996 | Kraemer et al. ........................ 60/274 |
| 5,642,705 | 7/1997 | Morikawa et al. . | |
| 5,775,099 | * | 7/1998 | Ito et al. ................................. 60/274 |
| 5,807,413 | * | 9/1998 | Wittenbrink et al. .................. 44/451 |
| 5,826,425 | * | 10/1998 | Rossi Sebastiano .................... 60/274 |
| 5,839,275 | * | 11/1998 | Hirota et al. ........................... 60/285 |

FOREIGN PATENT DOCUMENTS 8100638A     4/1996    (JP) .

OTHER PUBLICATIONS

Ando H. et al., "Mitsubishi GDI Engine Strategies to Meet the Euripean Requirements," AVL Tagung Motor Und Umwelt – Conference Engine and Environment, XX, XX, 1997, pp. 55, 57–70.

* cited by examiner

Primary Examiner—Thomas Denion
Assistant Examiner—Thai-Ba Trieu

(57) ABSTRACT

An in-cylinder injection type internal combustion engine, which includes a main fuel injection control unit that drives a fuel injector to inject fuel directly into a combustion chamber, is provided so that premixed combustion or stratified charge combustion takes place depending upon operating conditions of the engine. The engine further includes an additional fuel injection control unit that drives the fuel injector to inject additional fuel during an expansion stroke after the fuel injector is driven by the main fuel injection control unit, when it is necessary to increase the temperature of a catalyst provided in an exhaust passage for purifying exhaust gas. An exhaust manifold includes an exhaust chamber, in which the exhaust gas remains, and the additional fuel that is left unburned is re-burned in the exhaust chamber.

14 Claims, 12 Drawing Sheets

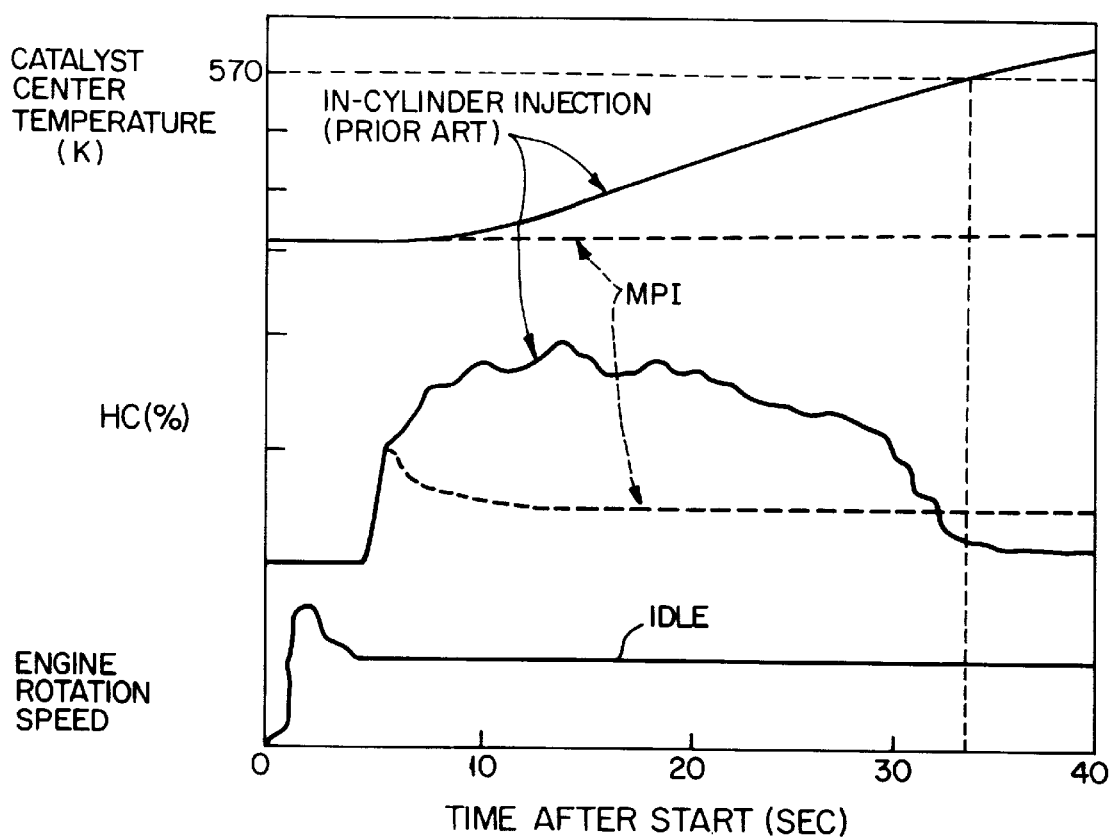

IN-CYLINDER INJECTION TYPE INTERNAL COMBUSTION ENGINE

BACKGROUND OF THE INVENTION

1. Field of the Invention

The present invention relates to an in-cylinder injection type internal combustion engine adapted to inject fuel directly into a combustion chamber, and particularly to such an in-cylinder injection type internal combustion engine that is suitably constructed to reduce discharge of unburned HC immediately after a cold start of the engine.

2. Discussion of Related Art

Recently, in-cylinder injection type internal combustion engines adapted to inject fuel directly into combustion chambers have come into practice. In such an in-cylinder injection type engine, the timing of fuel injection can be set as desired, allowing the engine to operate in an extreme lean-burn mode, utilizing a so-called stratified charge combustion, while the engine is in a low loaded operating region. In this lean-burn mode, the fuel is injected during a compression stroke so that an air-fuel mixture, whose fuel concentration is large enough to cause firing, is concentrated in the vicinity of a spark plug, to thus enable the stratified charge combustion.

When the above type of in-cylinder injection type engine starts operating in a cold state, or makes a cold start, it is desired, as in conventional engines, to activate a catalyst(s) provided in an exhaust passage, in the early stage of engine operation, to reduce the amount of unburned HC and other harmful substances that are released to the atmosphere.

In view of the above situation, it has been proposed in Japanese laid-open Patent Publication No. 8-100638 relating to in-cylinder injection type engines, to perform an additional fuel injection during the initial period to middle period of the expansion stroke, independently of fuel injection for main combustion, and ignite the additional fuel injected by the fuel injection, utilizing flame propagation from the main combustion, to increase the exhaust gas temperature, and accelerate warm-up of the catalyst for early activation of the catalyst.

Where the additional fuel injection is performed separately from the fuel injection for main combustion as described above, combustion of the injected additional fuel takes place over a region ranging from the inside of the combustion chamber to the inside of the exhaust port. If all of the additional fuel is completely burned, the resulting exhaust gas will contain almost no unburned HC.

In the meantime, the exhaust passage, through which the exhaust gas is discharged from the combustion chamber into the exhaust port, has a considerably small cross sectional area at the moment that an exhaust valve is opened. Upon opening of the exhaust valve, a high-pressure exhaust gas rushes out of the combustion chamber, into the exhaust port, and the flow rate of the exhaust gas is considerably high in the initial period of opening of the exhaust valve (where the crank angle is in the range of 135° to 180°). The exhaust gas having such a high flow rate in the initial period of opening of the exhaust valve is called "blow-down gas." Consequently, the additional fuel that was burning in the combustion chamber has its flame extinguished while it is flowing at a high speed with the blow-down gas, through the narrow exhaust passage just after opening of the exhaust valve, and part of the additional fuel that is left unburned is discharged as unburned HC, along with the blow-down gas.

The exhaust gas flowing from the combustion chamber into the exhaust port is discharged into an exhaust manifold to which a plurality of exhaust ports are connected, and mixed in the exhaust manifold with exhaust gases discharged from other cylinders, to be fed to the catalyst(s) located downstream of the exhaust manifold. At this time, even if an exhaust gas discharged from a certain cylinder contains unburned HC, the exhaust gas may be mixed with exhaust gases from other cylinders that are still burning, and the unburned HC can be expected to be re-burned.

In the known in-cylinder injection type internal combustion engine, however, the exhaust manifold consists of a pipe-connection type manifold 50 (used for a four-cylinder engine in this example), in which a plurality of pipes 55, 56, 57, 58 are connected together, as shown in FIGS. 17(a) and 17(b). To prevent reduction in the output due to interference of exhaust gases, the cylinders in which non-continuous combustion occurs are connected to each other through pipes, and the pipes 55, 56, 57, 58 are formed with minimum amount of curves so that exhaust gases can smoothly flow out of the pipes.

In the exhaust manifold 50 as described above, blow-down gas discharged at a high flow rate from each of the exhaust ports 51, 52, 53, 54 flows through a corresponding one of the pipes 55, 56, 57, 58, without being mixed with blow-down gases discharged from the other exhaust ports. Since the pipes 55, 56, 57, 58 that extend from the respective exhaust ports 51, 52, 53, 54 to a joining portion 59 are formed with a relatively large pipe length, combustion gases that were burning when discharged from the exhaust ports 51, 52, 53, 54 are cooled down by the time when the gases reach the joining portion 59, with a high possibility that the temperature of the gases is lower than the temperature that permits reaction between unburned HC and the combustion gases.

Accordingly, the exhaust gas containing unburned HC is unlikely to be mixed with exhaust gas that is still burning, for re-combustion of the unburned HC.

FIG. 18 shows changes in the pressure within the combustion chamber and changes in concentration of unburned HC, along with an ignition signal and a fuel injection signal, in the in-cylender injection type internal,combustion engine including the exhaust manifold as shown in FIGS. 17(a) and 17(b). Among the curves that represent changes in the concentration of unburned HC, the solid line indicates the concentration of unburned HC at point "a" in the exhaust port 51, and the broken line indicates the concentration of unburned HC at point "b" in the joining portion 59.

As shown in FIG. 18, unburned HC that is left unburned in the exhaust port 51, for example, is only slightly oxidized in a high-temperature atmosphere of exhaust gas, and its amount is reduced only by a small degree. Namely, the unburned HC from the exhaust port 51 is discharged from the exhaust manifold 50 into a downstream passage, while maintaining its high concentration, without being re-burned in the joining portion 59 while being mixed with blow-down gases discharged from the other exhaust ports 52, 53, 54.

FIG. 19 shows the temperature at the center of a catalyst during a cold start operation of the engine, and the HC concentration measured at the outlet of an exhaust manifold, with respect to the known in-cylinder injection type engine having the pipe-connection type manifold, and another known example of internal combustion engine (referred to as MPI (multi-point injection) engine in FIG. 19).

As shown in FIG. 19, when additional fuel injection is performed in the in-cylinder injection type engine as disclosed in the above-identified publication, the time required for the catalyst to be activated with its center temperature increased can be significantly reduced as compared with the known MPI engine. However, there is still a problem that unburned HC is released to the atmosphere until the catalyst is activated. Furthermore, unburned HC is produced by the additional fuel injection, in addition to that produced by the main combustion, and therefore the amount of unburned HC that remains until the catalyst is activated is larger than that of the known MPI engine.

In particular, if the additional fuel injection is conducted over a period from the initial period to middle period of the expansion stroke as disclosed in the above-identified publication, a large amount of unburned HC is produced, and a part of the energy of the additional fuel is used for increasing the pressure within the cylinder, resulting in variations in the output torque due to the increased pressure within the cylinder. Also, the temperature of the exhaust gas is not so largely increased, and therefore the activation of the catalyst does not proceed at a high speed.

SUMMARY OF THE INVENTION

It is therefore an object of the present invention to provide an in-cylinder injection type internal combustion engine wherein a catalyst can be activated in the early stage of engine operation, and discharge of unburned HC before the catalyst is activated can be surely reduced.

To accomplish the above object, the present invention provides an in-cylinder injection type internal combustion engine that includes a fuel injection control device having a main fuel injection control unit and an additional fuel injection control unit. The main fuel injection control unit drives a fuel injector to inject fuel directly into a combustion chamber, so that premixed combustion or stratified charge combustion takes place depending upon operating conditions of the engine. Where it is necessary to increase the temperature of a catalyst provided in an exhaust passage for purifying the exhaust gas, the additional fuel injection control unit drives the fuel injector to inject additional fuel during an expansion stroke after the fuel injector is driven by the main fuel injection control unit, to increase the temperature of the exhaust gas supplied to the catalyst. The engine further includes an exhaust manifold that includes an exhaust chamber in which the exhaust gas remains, and the additional fuel that is left unburned is re-burned in the exhaust chamber.

With the above arrangement, the additional fuel injected during the expansion stroke is burned so that high-temperature exhaust gas can be supplied to the catalyst. The high-temperature exhaust gas remains in the exhaust chamber of the exhaust manifold, in which unburned HC introduced along with the exhaust gas can be re-burned, and thus the amount of unburned HC released to the atmosphere can be significantly reduced until the catalyst is brought into the activated state. Due to re-combustion of the unburned HC in the exhaust chamber, the temperature of the exhaust gas that has been already increased by injection of the additional fuel during the expansion stroke can be further increased, which makes it faster to increase the temperature of the catalyst.

The exhaust manifold allows unburned HC to re-burn in the exhaust chamber while the additional fuel injection is being conducted, and the volume of the exhaust chamber is preferably controlled to prevent a reduction in the temperature of the exhaust gas after the additional fuel injection.

With the above arrangement, during the additional fuel injection, unburned HC that remains in the exhaust chamber is well mixed with combustion gas, so that the unburned HC can be re-burned with a high efficiency, resulting in a reduced amount of discharge of the unburned HC. Further, the volume of the exhaust chamber is controlled to minimize a reduction in the temperature of the catalyst due to otherwise possible reduction in the temperature of the exhaust gas after the additional fuel injection. Thus, the discharge of the unburned HC can be minimized over the whole operating period of the engine from the cold start to the normal operating region.

In one preferred form of the invention, the additional fuel injection control unit controls the fuel injection valve to inject the additional fuel during or after a middle period of the expansion stroke. In this case, part of the energy of the additional fuel is not used for increasing the pressure in the cylinder, and the temperature of the exhaust gas can be favorably increased, while discharge of unburned HC can be further reduced.

In another preferred form of the invention, the exhaust chamber of exhaust manifold has a total volume that is set to within a range of about 0.5 to 1.0 times as large as the total displacement of the internal combustion engine. In this case, unburned HC can be re-burned with further improved efficiency, with a result of a further reduction in discharge of the unburned HC.

Where the internal combustion engine includes a plurality of cylinders that are divided into a plurality of cylinder groups, the exhaust chamber of the exhaust manifold for each group of cylinders preferably has a volume that is about 0.5 to 1.0 times as large as the displacement of each group of cylinders. More preferably, the exhaust chamber has a total volume that is set to within a range of about 0.6 to 0.9 times as large as the total displacement of the internal combustion engine. With the volume of the exhaust chamber thus controlled, the unburned HC can be re-burned with a further improved efficiency, and the discharge of the unburned HC can be further reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) and FIG. 1(b) are schematic views showing flow of exhaust gas in an exhaust manifold of an in-cylinder injection type internal combustion engine according to the first embodiment of the present invention, wherein FIG. 1(a) is a view showing flow of exhaust gas as viewed from one side face of the manifold, and FIG. 1(b) is a view showing flow of exhaust gas as viewed from the front side of the manifold;

FIG. 4(a) and FIG. 4(b) are schematic views showing the construction of the exhaust manifold of the in-cylinder injection type engine of the first embodiment, wherein FIG. 4(a) is a side view of the exhaust manifold, and FIG. 4(b) is a front view of the exhaust manifold;

FIG. 19 is a view showing changes with time in the temperature at the center of catalyst and the concentration of unburned HC right after a cold start of the known in-cylinder injection type engine.

DETAILED DESCRIPTION OF THE PREFERRED EMBODIMENTS

Figure 1A:
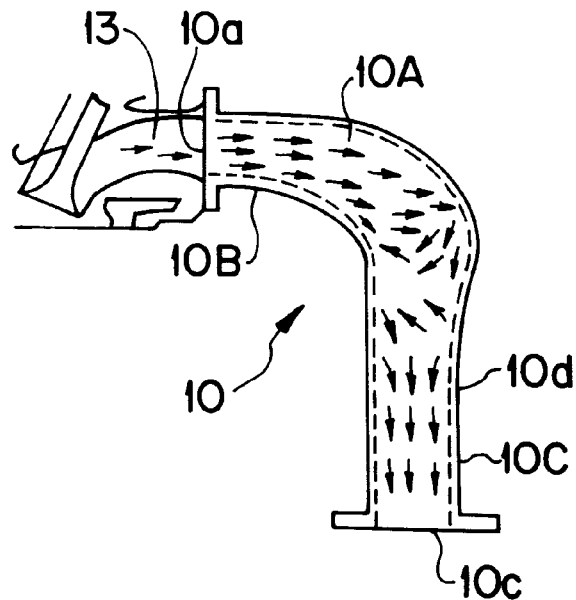

Preferred embodiments of the present invention will be described with reference to the accompanying drawings. Referring first to FIG. 1 to FIG. 11, the construction of an in-cylinder injection type internal combustion engine according to the first embodiment of the present invention will be described. As shown in FIG. 2, the in-cylinder injection type engine of the present embodiment is a spark-ignition type, four-cycle engine whose operating cycle includes a suction stroke, compression stroke, expansion stroke, and an exhaust stroke. Also, the present internal combustion engine is of in-cylinder injection type in which fuel is injected directly into a combustion chamber 1.

An intake passage 2 and an exhaust passage 3 are connected to the combustion chamber 1 such that these passages 2, 3 may be in fluid communication with the combustion chamber 1. An intake valve 4 is provided for controlling fluid communication between the intake passage 2 and the combustion chamber 1, and an exhaust valve 5 is provided for controlling fluid communication between the exhaust passage 3 and the combustion chamber 1.

An air cleaner and a throttle valve (not shown) are disposed in an upstream portion of the intake passage 2, and an intake port 12, located downstream of the throttle valve, is connected to the combustion chamber 1, and extends substantially upright with respect to the chamber 1. In the exhaust passage 3, an exhaust manifold 10 that collects exhaust gases discharged from the combustion chambers 1 of respective cylinders is connected to an exhaust port 13, and an exhaust purifying device 6 and a muffler (not shown) are provided downstream of the exhaust manifold 10. An oxygen sensor 14 for detecting the oxygen concentration of exhaust gas is located upstream of the exhaust purifying device 6, and a catalyst temperature sensor 15 for detecting the temperature in the exhaust purifying device 6 is provided within the exhaust purifying device 6. Also, an injector (fuel injection valve) 8 is located such that its opening is exposed to the combustion chamber 1.

In the in-cylinder injection type engine constructed as described above, the intake air, whose amount depends upon the opening amount of the throttle valve (not shown), is sucked into the combustion chamber 1 through the intake port 12, upon opening of the intake valve 4, and mixed with fuel that is directly injected from the injector 8 in response to a signal from an electronic control unit (ECU) 20. The air/fuel mixture is ignited by a spark produced by a spark plug 7, to start burning and generating engine torque, and resulting exhaust gas is then discharged from the combustion chamber 1 into the exhaust passage 3, upon opening of the exhaust valve 5. After three harmful components, CO, HC, and NOx, contained in the exhaust gas, are purified by the exhaust purifying device 6, the exhaust gas passes through the muffler for reducing noise, and released in the atmosphere.

The exhaust purifying device 6 includes a NOx catalyst 6A and a three-way catalyst 6B that are combined together. Where the air-fuel ratio is lean, the exhaust gas contains almost no CO and HC, but the NOx concentration is rapidly increased. The NOx catalyst 6A that performs its function in an oxygen excessive atmosphere (lean atmosphere) adsorbs NOx contained in the lean exhaust gas, and then reduces and releases the adsorbed NOx in a reducing atmosphere having the stoichiometric ratio or rich air-fuel ratio. If the air-fuel ratio is equal to or smaller than the stoichiometric ratio, CO, HC, and NOx contained in the exhaust gas are purified by the three-way function of the three-way catalyst 6B. Where the NOx catalyst 6A includes a NOx adsorption type catalyst as in this embodiment, another three-way catalyst may be provided upstream of the NOx catalyst 6A. The NOx catalyst 6A is not necessarily of NOx adsorption type, but may include a selective reduction type NOx catalyst that selectively reduces and removes NOx in an oxygen excessive atmosphere.

The in-cylinder internal combustion engine of the present embodiment operates in a selected one of three fuel injection modes, i.e., a late-period injection mode, an early-period injection mode, and a stoichiometric operation mode. In the later-period injection mode, the fuel is injected during a compression stroke (in particular, in the latter half of the compression stroke), to permit the engine to perform a lean-burn operation utilizing stratified charge combustion, to improve fuel economy. In the early-period injection mode, the fuel is injected during a suction stroke (in particular, in the former half of the suction stroke), to permit the engine to perform a lean-burn operation utilizing premixed combustion, to provide large output with relatively slow acceleration. In the stoichiometric operation mode, the fuel is injected during a suction stroke, to permit the engine to perform a stoichiometric operation, through premixed combustion of an air/fuel mixture having the stoichiometric ratio, to provide greater output than that obtained in the early-period injection mode. An appropriate one of the above fuel injection modes is selected depending upon operating conditions of the engine.

As shown in FIG. 2, the ECU 20 of the present in-cylinder injection type engine includes an operating mode selecting device 24, a fuel injection control device 25, and an ignition timing control device 28.

The operating mode selecting device 24 selects one of the operating modes as described above, depending upon the engine speed Ne, and the engine load (the average effective pressure Pe in this embodiment, but may be the operating angle of the accelerator pedal).

The fuel injection control device 25 includes a normal fuel injection control unit (main injection control unit) 26 that drives the injector 8 to inject fuel that is normally burned to provide a desired engine output, and a additional fuel injection control unit 27 that drives the injector 8 to inject additional fuel during an expansion stroke, to activate the catalysts 6A and 6B.

The normal fuel injection control unit 26 selects a fuel injection control map that matches the operating mode selected by the operation mode selecting device 24, and sets the fuel injection amount and injection timing (i.e., injection starting point and injection finishing point), according to the engine speed Ne and the average effective pressure Pe, using the selected fuel injection control map.

The present engine further includes an engine speed sensor 16, and an accelerator pedal position sensor (APS) 17. The engine rotation speed Ne is obtained from detected information (or calculated information) of the engine speed sensor 16, and the average effective pressure Pe is calculated based on the engine speed Ne, and an operating angle (or depression angle) θ of the accelerator pedal that is detected by the accelerator pedal position sensor 17.

The additional fuel injection control unit 27 serves to control additional fuel injection that is conducted for the purpose of increasing the temperature of exhaust gas to activate the catalysts 6A, 6B that are in non-activated states. The control unit 27 determines whether the catalysts 6A, 6B are in activated states or not, based on detected information from the catalyst temperature sensor 15. If the catalysts 6A, 6B are not in the activated states, the control unit 27 drives the injector 8 to inject additional fuel, that is to be ignited through low-temperature oxidizing reaction (that will be described later), during an expansion stroke.

More specifically, if the temperature Tc (hereinafter called "catalyst temperature") of the catalysts 6A, 6B or its vicinity, which is detected by the catalyst temperature sensor 15, is equal to or lower than a predetermined temperature Tc0, the additional fuel control unit 27 determines that the catalysts 6A, 6B are not in the activated states, and controls the injector 8 so that additional fuel is injected during an expansion stroke of each cylinder. In the in-cylinder injection type engine of the present embodiment, the additional fuel injection (expansion-stroke injection) is performed so that the injection is finished during the middle period of the expansion stroke (where the crank angle is 90°±30°) or after the middle period of each cylinder, taking account of the amount of HC generated, and influences on the output torque of the engine. The predetermined temperature Tc0 may be set to be equal to the activation temperature of the catalyst 6A, 6B, i.e., the lower limit of the activation region of the catalysts. It is, however, desirable to set the predetermined temperature Tc0 to be higher than the activation temperature by a suitable level β (namely, the predetermined temperature Tc0=activation temperature+β), in view of control delay. The additional fuel may be injected based on the coolant temperature of the engine and the time that elapses from the start of the engine, instead of using the catalyst temperature sensor 15.

The ignition timing control device 28 controls the ignition timing of the spark plug 7 in accordance with the fuel injection control of the normal fuel injection control unit 26. The ignition timing control device 28 selects an ignition timing control map that matches the operating mode selected by the operating mode selective device 24, and sets the ignition timing corresponding to the fuel injection control of the normal fuel injection unit 26, according to the engine speed Ne and the average effective pressure Pe, using the selected ignition timing control map.

Figure 3:
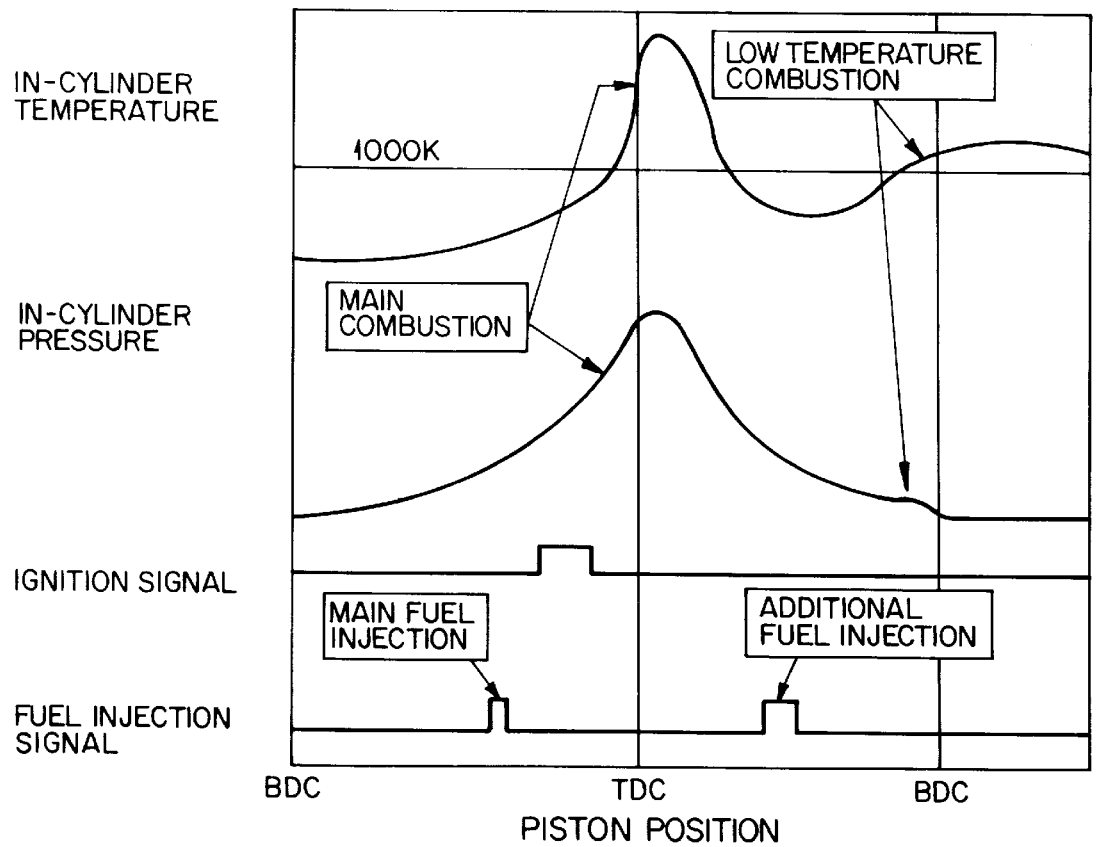
FIG. 3 is a graph showing the timing of ignition signal and fuel injection signal of the in-cylinder injection type engine of the first embodiment, and changes in the temperature and pressure in the cylinder, in relation to the piston position.

Referring next to FIG. 3, a series of fuel control operations ranging from the main injection to the expansion-stroke injection in the present in-cylinder injection type engine will be described.

If the engine starts operating in a cold state, and rotates at a low speed with a small load, the operating mode selecting device 24 selects the later-period injection mode so that the engine performs a lean-burn operation through stratified charge combustion, for improved fuel economy. In this mode, a fuel injection signal is applied from the normal fuel injection control unit 26 to the injector 8 in the latter half of the compression stroke, and the injector 8 injects the fuel into the combustion chamber 1 while the fuel injection signal is being applied thereto. This fuel injection will be called "main injection" intended for accomplishing main combustion.

During the main injection, the air/fuel mixture in the combustion chamber 1 is kept being compressed as the piston 9 is lifted up in accordance with rotation of the crank shaft, and therefore the temperature (in-cylinder temperature) and pressure (in-cylinder pressure) within the combustion chamber 1 are kept increasing as the piston 9 compresses the mixture in the combustion chamber 1.

In the last period of the compression stroke in which the fuel injection from the injector 8 is finished, an ignition signal is applied from the ignition timing control device 28 to the spark plug 7, and the spark plug 7 ignites the air/fuel mixture in the combustion chamber 1 in response to the ignition signal.

In the above-described operation, the intake air flowing from the intake port 12 forms a vertical swirl (reverse tumble flow) in the combustion chamber 1, and this vertical swirl is utilized so that the fuel directly injected from the injector 8 is concentrated only in the vicinity of the spark plug 7 provided at the top, central part of the combustion chamber 1. As a result, the stoichiometric ratio or rich air-fuel ratio is established only in the vicinity of the spark plug 7, while an extremely lean air-fuel ratio is established in a chamber portion remote from the spark plug 7. In this condition, the air-fuel ratio of the mixture in the combustion chamber 1 as a whole is sufficiently larger (or leaner) than the stoichiometric ratio, but stable stratified charge combustion or extreme-lean combustion takes place in the combustion chamber 1 upon ignition of the air/fuel mixture by the spark plug 7.

As a result of the combustion of the air/fuel mixture, the temperature and pressure in the combustion chamber 1 rapidly increase, and reach their maximum levels when the position of the piston 9 slightly passes its top dead center. At the maximum, the temperature becomes much higher than 1000K. The increase in the pressure in the combustion chamber 1 as a result of the combustion is converted into engine torque, which is output through the crank shaft.

Once the piston 9 passes over the top dead center, the transition from the compression stroke to the expansion stroke takes place. With a decrease in the compression ratio during the expansion stroke, the temperature and pressure in the combustion chamber 1 are reduced, and the temperature in the combustion chamber 1 becomes much lower than 1000K around the middle period of the expansion stroke.

In order to activate the catalysts 6A, 6B in the early stage of engine operation, the temperature at the center of the catalysts 6A, 6B needs to be increased to the activation temperature (about 570 K). To this end, the temperature of the exhaust gas supplied to the catalysts 6A, 6B is required to be equal to or higher than the activation temperature. Even if the temperature in the combustion chamber 1, or that of the combustion gas, reaches 1000 K or higher as a result of the main combustion, the temperature of the combustion gas becomes lower and lower as the volume of the chamber 1 increases during the following expansion stroke. As the volume of the combustion chamber 1 keeps increasing, it becomes impossible to supply exhaust gas having a higher temperature than the activation temperature, to the catalysts 6A, 6B. In addition, the fuel in the air/fuel mixture burns with a high efficiency where stratified charge (extreme-lean) combustion takes place as in the present in-cylinder injection type engine, and therefore there is little possibility that the remaining fuel that is left unburned burns during the expansion stroke so as to keep the combustion gas at a high temperature (that is higher than the activation temperature).

In the in-cylinder injection type engine of the present embodiment, when the catalyst temperature Tc detected by the catalyst temperature sensor 15 is lower than the predetermined temperature Tc0, the additional fuel injection control unit 27 supplies an additional fuel injection signal to the injector 8 at a point of during the middle period of the expansion stroke (where the crank angle is (90°±30°) or after the middle period. The additional fuel injection signal is set to be longer than the fuel injection signal for the main injection, and the injector 8 injects the additional fuel directly into the combustion chamber 1 while the additional fuel injection signal is being applied thereto. The injection of the additional fuel is also called "expansion-stroke injection" intended for re-combustion of an unburned fuel component.

The additional fuel injected from the injector 8 directly into the combustion chamber 1 is fired or ignited using a high-temperature atmosphere, without requiring the spark plug 1 to create a spark again. The ignited additional fuel burns at a relatively low temperature compared to the main combustion, over a period of time ranging from the later expansion stroke to the exhaust stroke, to increase the temperature of the combustion chamber 1 to a certain point above 1000K. At this time, the energy generated by the combustion of the additional fuel is not converted into an increase of the pressure in the combustion chamber 1, but only used for increasing the temperature in the combustion chamber 1. Thus, the use of the additional fuel does not result in variations in the engine torque.

As described above, the additional fuel injected during or after the middle period of the expansion stroke is mixed with a lean mixture that failed to burn during main combustion but has been brought into a ready-to-burn state in a high-temperature atmosphere, whereby a part of the mixture at a particular position in the combustion chamber starts firing by itself. Thus, the injection of the additional fuel during or after the middle period of the expansion stroke brings about combustion at a relatively low temperature compared to the main combustion, over the period of time ranging from the later expansion stroke to the exhaust stroke. This type of combustion is called "low-temperature oxidizing reaction."

In the last period of the expansion stroke, the exhaust valve 5 is opened, and high-temperature combustion gas of 1000K or higher is discharged from the combustion chamber 1 to the exhaust passage 3. The additional fuel injection control unit 27 is adapted to perform the expansion-stroke injection to increase the temperature of the exhaust gas, until the temperature Tc (catalyst temperature) of the catalysts 6A, 6B, detected by the catalyst temperature sensor 15, exceeds the predetermined temperature Tc0.

As described before, the exhaust passage 3, through which the combustion gas is discharged from the combustion chamber 1 into the exhaust port 13, is considerably narrow at the moment that the exhaust valve 5 is opened, and the flow rate or speed of the combustion gas is considerably high in the initial opening period of the exhaust valve. When the temperature of the atmosphere is low at a cold start of the engine, therefore, part of the combustion gas that has reached a high temperature in the combustion chamber 1 has its flame extinguished while it is flowing at a high speed, along with blow-down gas, through the narrow exhaust passage immediately after the exhaust valve opens. As a result, the additional fuel that is left unburned is discharged as unburned HC, along with the blow-down gas.

Figure 4A:
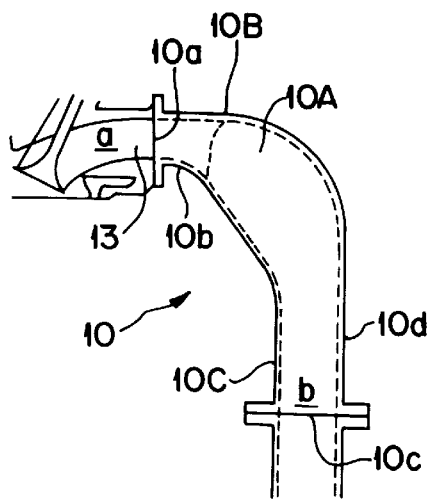
Figure 4B:
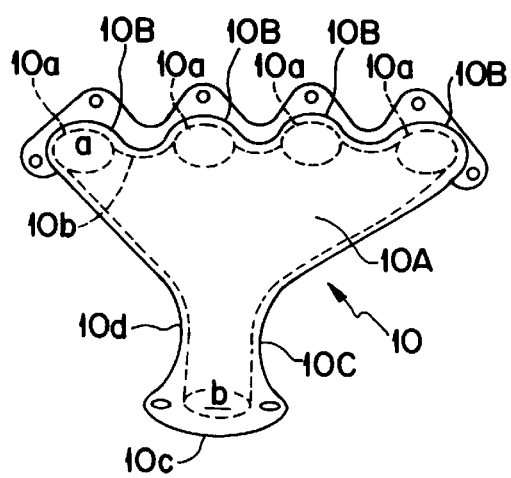

In the in-cylinder injection type internal combustion engine of the present embodiment, the exhaust manifold 10 is constructed as shown in FIGS. 4(a) and 4(b), for the purpose of re-burning the unburned HC. In this embodiment, the in-cylinder injection type engine is a series four-cylinder engine.

As shown in FIGS. 4(a) and 4(b), the exhaust manifold 10 includes mutually independent branches 10B that extend from respective joints (manifold inlets) 10a that are connected to the exhaust ports 13 of respective cylinders of the engine. These branches 10B converge or join together, to provide a collecting portion 10C having a certain diameter, which is in turn joined at a manifold outlet 10c to a downstream-side exhaust passage. In addition, an exhaust chamber 10A is provided in a joining portion that extends from an upstream joining portion 10b, at which the gases flowing from the branches 10B meet or start joining together, to a downstream joining portion 10d (that provides the collecting portion 10C), at which joining of the gases is completed.

Figure 1B:
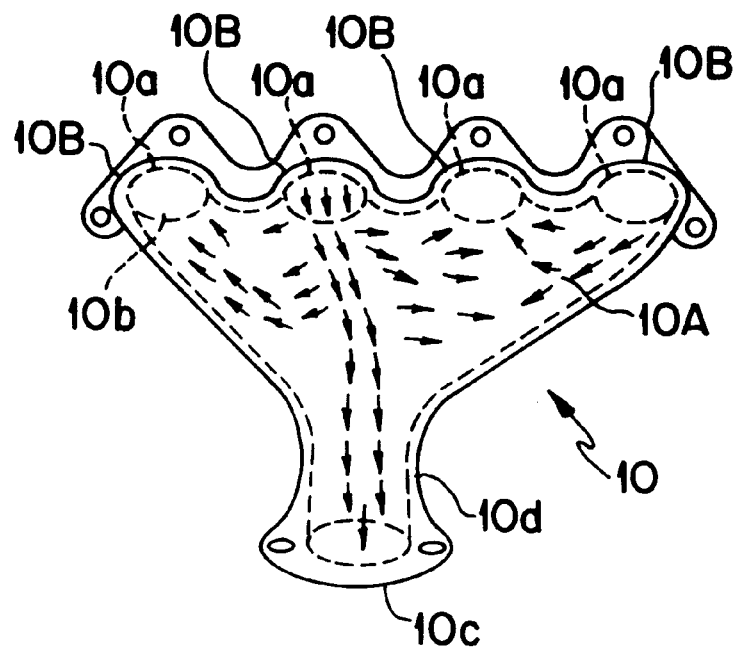
Figure 2:
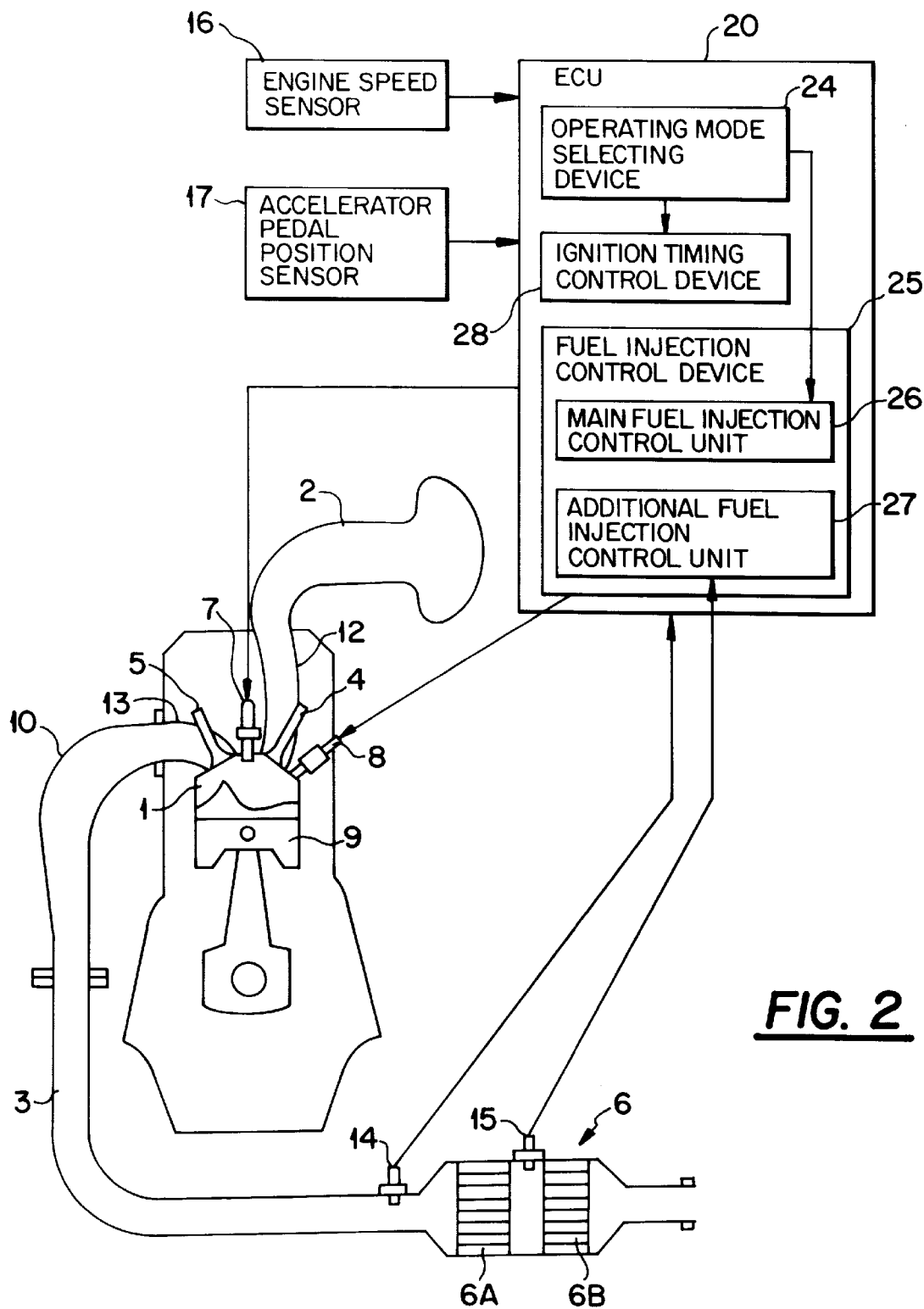
FIG. 2 is a schematic view showing the construction of the in-cylinder injection type internal combustion engine according to the first embodiment of the present invention, along with a control system.

As shown in FIG. 1(a) and FIG. 1(b), the exhaust chamber 10A is shaped such that the exhaust gases flowing from the exhaust ports 13 collide with the inner wall of the exhaust chamber 10A at substantially right angles. With this arrangement, the exhaust gas form various types of flow, such as swirl flow, due to the collision with the inner wall, interference with exhaust gases from other cylinders, and differential pressures produced by exhaust pulsation.

Since the exhaust chamber 10A has a significantly larger volume than each pipe of the known exhaust manifold, the exhaust gas that enters the exhaust chamber 10A is less likely to flow through the chamber 10A, directly toward the manifold outlet 10c, but tends to stay or remain for a while within the exhaust chamber 10A.

In FIG. 1(a) and FIG. 1(b), flow of exhaust gas that enters the exhaust chamber 10A is schematically indicated by arrows. FIG. 1(a) and FIG. 1(b) show the case where an exhaust gas flows from the exhaust port 13 of, for example, the second cylinder (the second one as counted from the left in FIG. 1(b)).

Although blow-down gas having a high flow rate is likely to flow through the exhaust chamber 10A, unburned HC discharged along with the blow-down gas remains in the exhaust chamber 10A due to the above-described shape of the chamber 10A, and reduced speed of the blow-down gas resulting from the interference with other exhaust gases and the exhaust pulsation. The unburned HC that remains in the exhaust chamber 10A is mixed with exhaust gases flowing into the chamber 10A from the same cylinder, and other cylinders that meet at the joining portion 10b. At this time, part of the additional fuel injected in the expansion stroke is still burning, and the temperature of part of the exhaust gases that is still burning exceeds 1000K, as shown in FIG. 3. Upon mixing with the still burning exhaust gas, the unburned HC remaining in the exhaust chamber 10A is fired and starts burning.

The exhaust gas that flows into the exhaust manifold 10 while burning also remains in the exhaust chamber 10A, to re-burn the unburned HC in the chamber 10A so that its burning reaction continues. Thus, the exhaust gas maintains its oxidizing capability (burning ability), and its combustion heat can be effectively utilized for bringing the catalysts 6A, 6B into the activated states.

Figure 5:
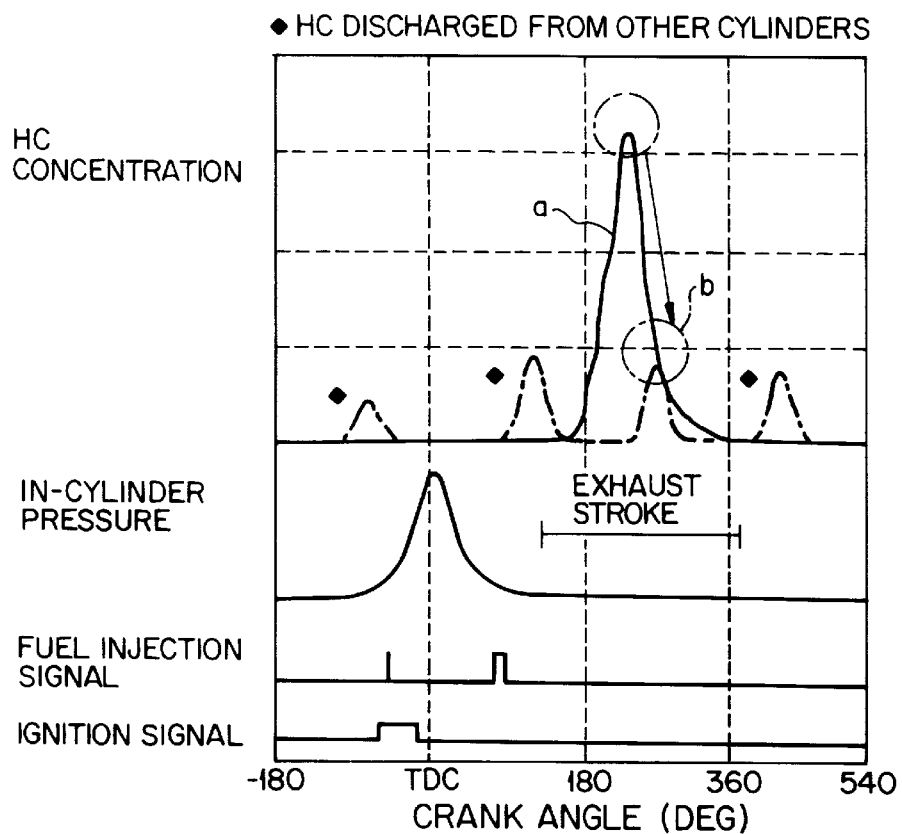
FIG. 5 is a graph showing the timing of ignition signal and fuel injection signal of the in-cylinder injection type engine of the first embodiment, and changes in the concentration of unburned HC and the pressure in the cylinder, in relation to the crank angle.

By mixing the unburned HC with the burning exhaust gas for re-burning of HC, the amount of the unburned HC discharged from the exhaust manifold 10 is reduced as shown in FIG. 5.

In FIG. 5, the crank angle taken along the horizontal axis is that of the first cylinder (the leftmost cylinder in FIG. 4(b)), and solid lines (from the bottom to the top in FIG. 5) respectively indicate the ignition signal and the fuel ignition signal applied for the first cylinder, corresponding changes in the pressure in the combustion chamber 1, and the concentration of unburned HC at point "a" in the exhaust port 13 as shown in FIG. 4. The broken line in FIG. 5 indicates the concentration of unburned HC at point "b" of the manifold outlet 10c as shown in FIG. 4. Four crests indicated by the broken line represent the concentration of unburned HC discharged from each of the four cylinders. Of these four crests, the crest corresponding to a crank angle of around 270° represents the concentration of unburned HC discharged from the first cylinder.

As shown in FIG. 5, unburned HC in the exhaust gas flowing from the exhaust port 13 into the exhaust manifold 10 re-burns in the exhaust chamber 10A, and its concentration is dramatically reduced when the exhaust gas is discharged from the manifold outlet 10c, as compared with when the gas flows into the manifold 10, as indicated by the arrow in FIG. 5.

Figure 6:
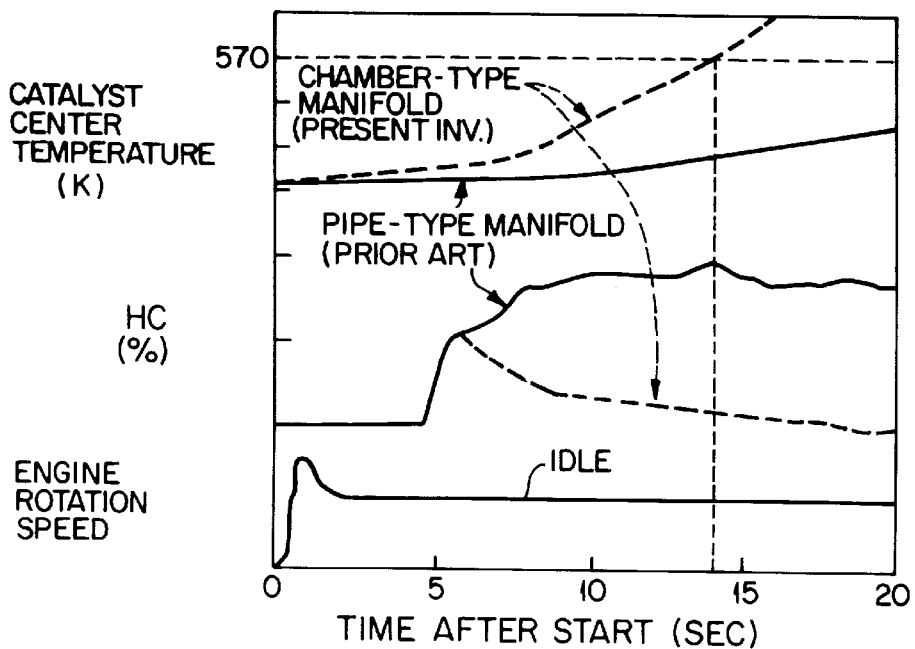
FIG. 6 is a graph showing changes with time in the temperature at the center of catalysts, and the concentration of unburned HC just after a cold start of the engine according to the first embodiment of the invention.
Figure 17A:
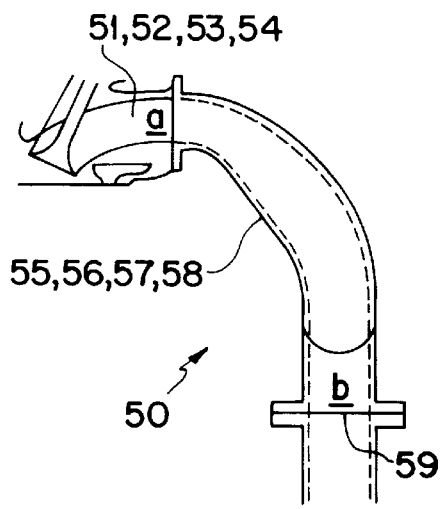
FIG. 17($a$) and FIG. 17($b$) are schematic views showing the construction of an exhaust manifold of a known in-cylinder injection type internal combustion engine, wherein FIG. 17($a$) is a side view of the exhaust manifold, and FIG. 17($b$) is a front view of the manifold.
Figure 17B:
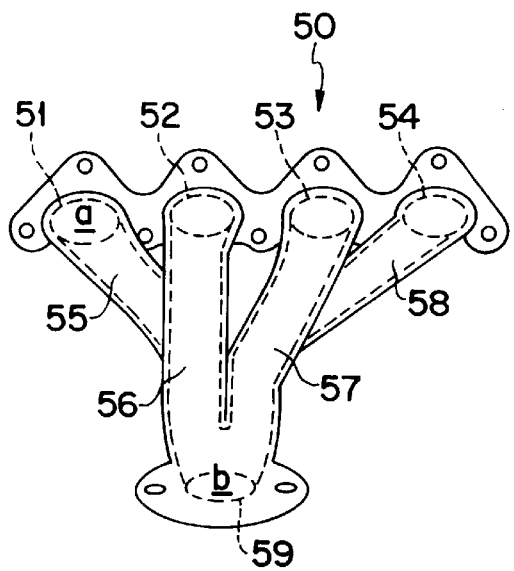

FIG. 6 is a graph showing the temperature at the center of the catalysts and the HC concentration at the outlet of the exhaust manifold when the engine starts operating in a cold state, for comparison between the in-cylinder injection type engine of the present embodiment including the exhaust manifold (chamber-type manifold) 10, and the known in-cylinder injection type engine including the pipe-connection type manifold as shown in FIGS. 17(a) and 17(b). In comparison, the both types of the engines are driven at the same speed in an idling state.

Figure 18:
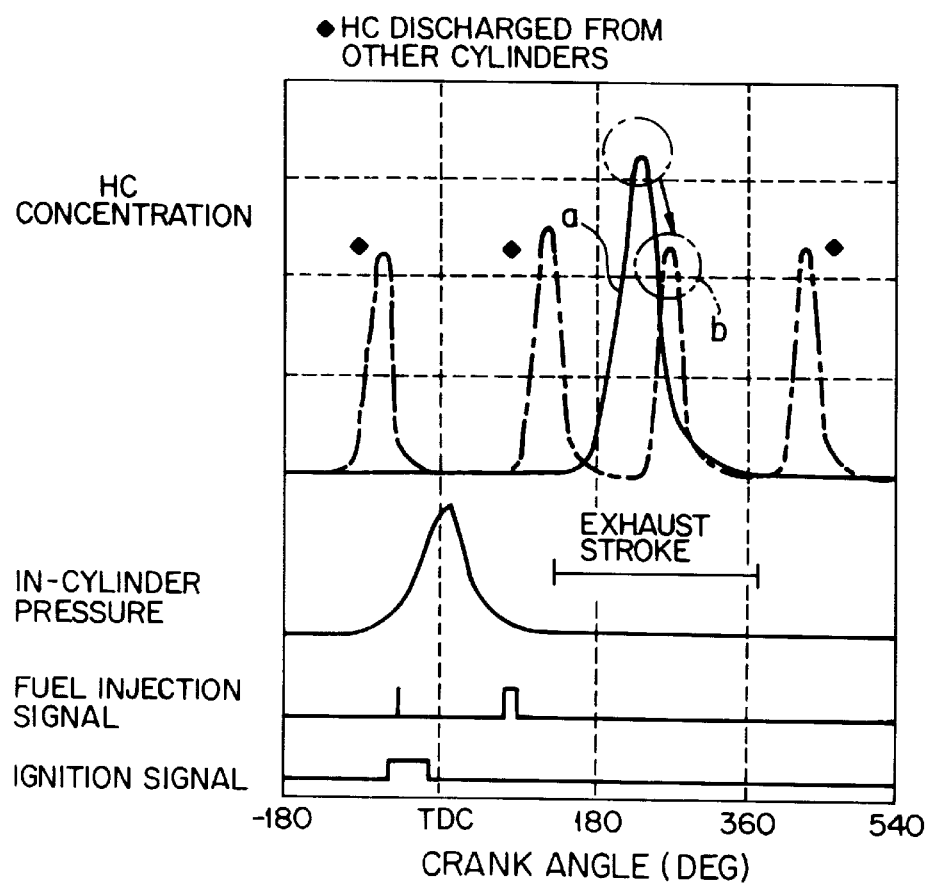
FIG. 18 is a graph showing the timing of ignition signal and fuel injection signal of the known in-cylinder injection type engine, and changes in the unburned HC concentration and the pressure in the cylinder, in relation to the crank angle.

As shown in FIG. 6, while the concentration of unburned HC, discharged from the engine of the present embodiment, is at about the same level as that of the known engine (including the pipe-connection type manifold) in the initial period right after the start of the engine, the HC concentration is then rapidly reduced, and becomes almost 0 when about 10 seconds elapses after the start. This level of HC concentration is even lower than that of the known MPI engine as shown in FIG. 18.

The concentration of unburned HC is significantly reduced as compared with the known in-cylinder injection type engine, because the exhaust gas containing unburned HC is mixed with exhaust gases discharged from other cylinders in the exhaust chamber 10A when passing through the exhaust manifold 10 while being kept at a high temperature. Further, the concentration of unburned HC can be reduced to almost 0 for the following reason: if new unburned HC flows into the exhaust chamber 10A that has been in the burning state, the newly introduced unburned HC also re-burns due to flame propagation, and the interior of the exhaust chamber 10A is kept in the burning state due to continuous combustion of unburned HC, thus assuring a high efficiency in the combustion of unburned HC.

As a result, the temperature of the exhaust gas supplied to the catalysts 6A, 6B, which is already increased due to the additional fuel injection conducted in the middle period of the expansion stroke, is now further increased because of re-burning of unburned HC in the exhaust chamber 10A. Consequently, warm-up of the catalysts 6A, 6B by the exhaust gas is accelerated, and the temperature at the center of the catalysts 6A, 6B is increased at a speed several times faster than that of the known in-cylinder injection type engine.

When the exhaust manifold 10 is provided with the exhaust chamber 10A as described above, the size of the exhaust manifold 10 is increased by an amount corresponding to the exhaust chamber 10A, with a result of increases in the heat capacity and the surface area. Therefore, the heat of the exhaust gas tends to be released to the atmosphere through the exhaust manifold 10. Namely, the provision of the exhaust chamber 10A yields an advantageous effect that the exhaust gas temperature is increased due to re-burning of unburned HC in the exhaust chamber 10A, but also has a disadvantage that the amount of dissipated heat is increased due to the increased surface area.

Since additional fuel is injected in addition to normal fuel injection until the catalysts 6A, 6B are activated, the temperature of the exhaust gas is greatly increased due to combustion of the additional fuel and re-combustion of unburned HC in the exhaust chamber 10A, and therefore the heat dissipated from the exhaust chamber 10A has a relatively small influence on the exhaust gas temperature. If the volume or size of the exhaust chamber 10A is not large enough, to the contrary, the unburned HC cannot be efficiently re-burned due to a lack of time for accumulating exhaust gases and causing a sufficient reaction.

If the additional fuel injection is finished with the catalyst 6A, 6B now being activated, and only the normal fuel injection control is performed, the heat dissipation from the exhaust chamber 10A has a greater influence on the exhaust gas temperature, namely, the exhaust gas temperature is lowered due to heat dissipation. Naturally, this reduction in the exhaust gas temperature becomes more apparent as the volume of the exhaust chamber 10 is increased.

If the exhaust gas temperature is lowered, the temperature of the catalysts 6A, 6B is correspondingly lowered. Where the stratified charge combustion (extreme-lean combustion) takes place as in the in-cylinder injection type engine of the present embodiment, in particular, the fuel in the air/fuel mixture burns at a high efficiency, to provide an improved heat efficiency, and therefore heat loss to the exhaust gas is reduced, resulting in a lowered exhaust gas temperature as compared with the conventional engine. If the exhaust gas temperature is lowered due to heat dissipation from the exhaust chamber 10A, therefore, the catalyst temperature becomes lower than the activation temperature, resulting in a reduction in the purifying efficiency of the catalysts 6A, 6B.

Accordingly, the volume of the exhaust chamber 10A needs to be determined so that unburned HC remaining in the exhaust chamber 10A is well mixed with the combustion gas during the cold start of the engine, so that the unburned HC can be re-burned with high efficiency and thus prevented from being discharged, while at the same time minimizing the reduction in the purifying efficiency of the catalysts 6A, 6B due to reduction in the exhaust gas temperature after the additional fuel injection is finished. In other words, the volume of the exhaust chamber 10A is determined as described above, so that the discharge of unburned HC can be minimized over the whole operating period of the engine from the cold start to the normal operation.

Figure 7:
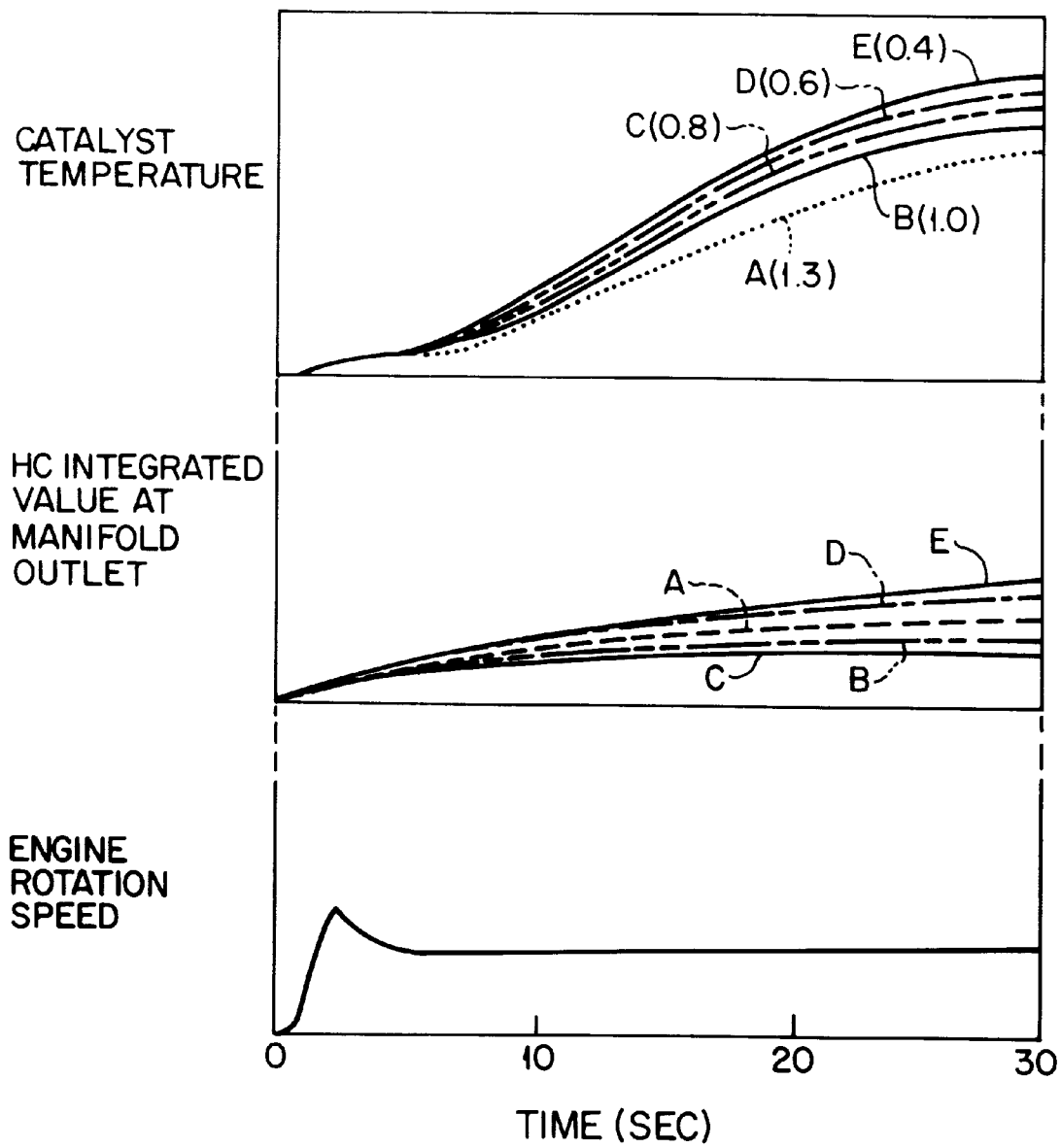
FIG. 7 is a graph showing changes with time in the temperature at the center of the catalysts and the integrated discharged amount of unburned HC during a cold start operation of the in-cylinder injection type engine of the first embodiment, with respect to different volumes of an exhaust chamber of the exhaust manifold.
Figure 8:
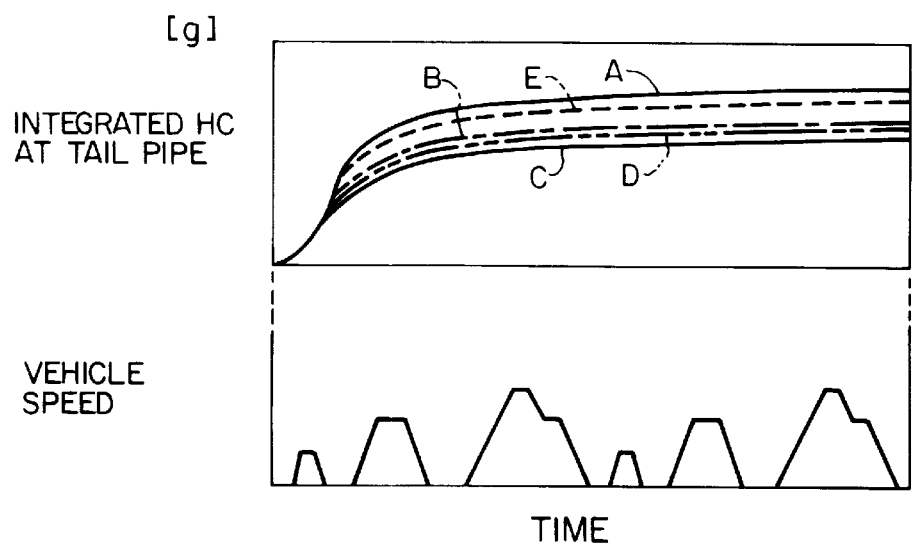
FIG. 8 is a graph showing changes with time in the integrated discharge amount of unburned HC when the vehicle speed is changed in a certain pattern after the cold start of the engine of the first embodiment, with respect to different volumes of the exhaust chamber of the exhaust manifold.
Figure 9:
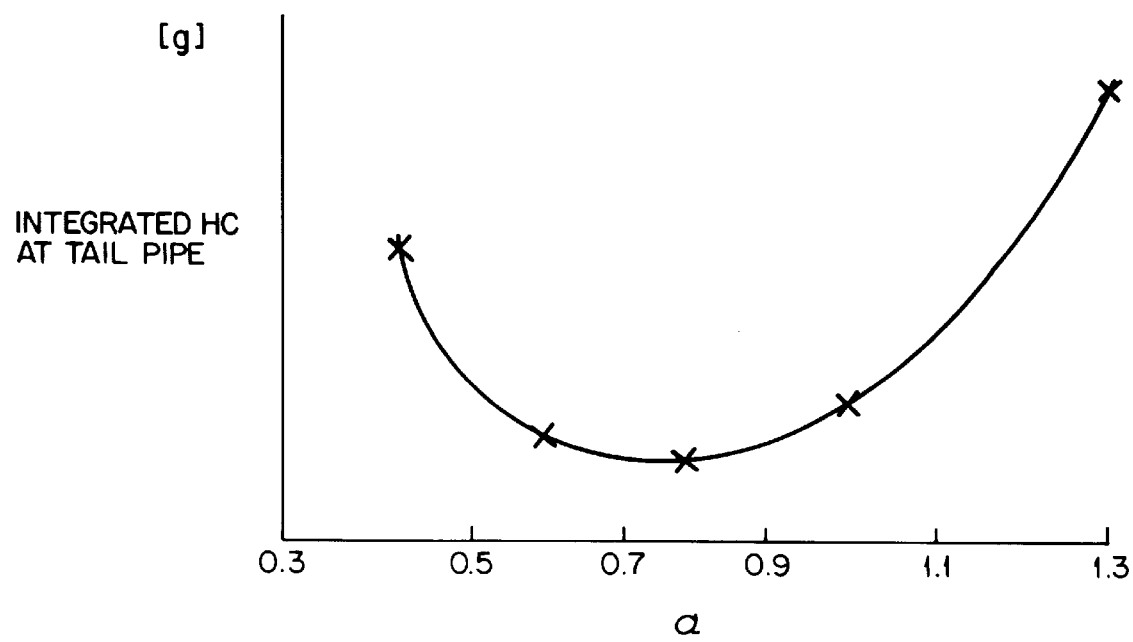
FIG. 9 is a graph showing the relationship between the integrated discharged value of unburned HC of the in-cylinder injection type engine of the first embodiment of the invention, and the ratio α (α=volume of exhaust chamber/engine displacement) of the volume of the exhaust chamber of the exhaust manifold.
Figure 10A:
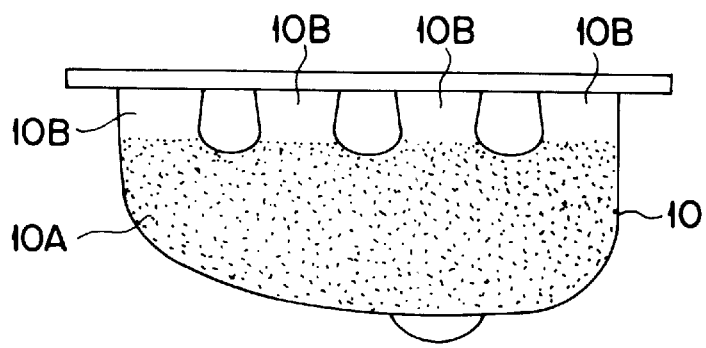
FIG. 10($a$) through FIG. 10($c$) are views useful in explaining the exhaust chamber of the exhaust manifold of the in-cylinder injection type engine of the first embodiment, wherein FIG. 10($a$) is a plan view of the exhaust manifold, FIG. 10($b$) is a front view of the manifold, and FIG. 10($c$) is a side view of the manifold.
Figure 10B:
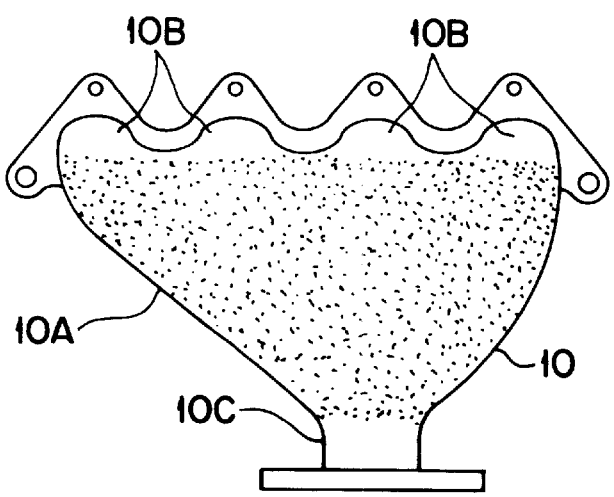
Figure 10C:
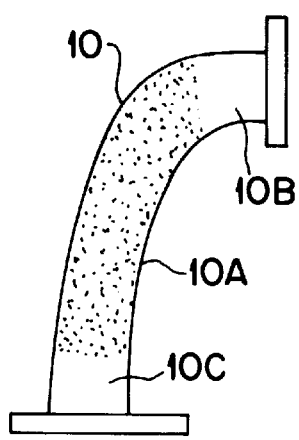

FIG. 7 through FIG. 9 show the relationship between the volume of the exhaust chamber 10A and the discharged amount of unburned HC. Where the volume of the exhaust chamber 10A is represented by the ratio ($\alpha$=volume of exhaust chamber/engine displacement) with respect to the displacement of the engine, line A in FIG. 7 and FIG. 8 represents the case where $\alpha$ is equal to 1.3, line B represents the case where $\alpha$ is equal to 1.0, line C represents the case where $\alpha$ is equal to 0.8, line D represents the case where $\alpha$ is equal to 0.6, and line E represents the case where $\alpha$ is equal to 0.4. The volume of the exhaust chamber 10A means the volume of the joining portion of the exhaust manifold 10, namely, a portion (smudged area in FIG. 10($a$)–FIG. 10($c$)) of the exhaust manifold 10 other than the branches 10B connected to the respective cylinders on the upstream side, and the collecting portion 10C with a narrowed passage on the downstream side.

FIG. 7 shows changes with time in the catalyst temperature (temperature at the center of the catalyst) and the integrated value of unburned HC at the outlet of the exhaust manifold when the engine starts operating in a cold state, in relation to the engine speed.

As shown in FIG. 7, the catalyst temperature decreases with an increase in the ratio $\alpha$, namely, with an increase in the volume of the exhaust chamber 10A. This is because the surface area of the exhaust manifold is increased due to the increased size of the exhaust chamber 10A, and heat of the exhaust gas is more likely to dissipate from the exhaust chamber 10A, with the result of reduction in the exhaust temperature.

It will be understood by comparing line A ($\alpha$=1.3) with line B ($\alpha$=1.0) that if the exhaust chamber 10A has a certain volume that is larger than that of line B, the increased surface area greatly affects the exhaust gas temperature, and the catalyst temperature is increased with an undesirable delay. For this reason, the ratio $\alpha$ is preferably equal to or smaller than 1.0.

On the other hand, the integrated value of unburned HC at the outlet of the exhaust manifold tends to be reduced if a sufficiently large volume of the exhaust chamber 10A is provided. Namely, the exhaust chamber 10A having a sufficiently large volume is required to allow unburned HC and combustion gas remaining in the exhaust chamber 10A to be well mixed together to achieve favorable combustion. If the exhaust chamber 10A has an insufficient volume, the unburned HC is likely to be discharged without being re-burned.

FIG. 8 shows the integrated discharged amount of unburned HC at the outlet of the tail pipe when the vehicle speed is changed in a certain pattern or mode after the cold start of FIG. 7, with respect to the engines having difference volumes of exhaust chambers 10A.

As shown in FIG. 8, line C ($\alpha$=0.8) and line D ($\alpha$=0.6) show relatively low values in the integrated discharged amount of unburned HC at the outlet of the tail pipe. In the case of line C, this is because unburned HC generated during the cold start is reduced through re-burning in the exhaust chamber 10A, as shown in FIG. 7. In the case of the line D, the reaction for reducing unburned HC is less likely occur in the exhaust chamber 10A than that in the case of the C line, but the amount of heat dissipation from the exhaust chamber 10A is comparatively small, and the catalyst temperature can be kept at a high level after warm-up of the engine.

It is, however, to be noted that line A ($\alpha$=1.3) and line E ($\alpha$=0.4) show relatively high values in the integrated discharged amount of unburned HC. In the case of the line A where the volume of the exhaust chamber 10A is larger than a certain value (e.g., 1.0), the catalyst temperature is increased at a low rate, as shown in FIG. 7, and the purifying efficiency of the catalysts 6A, 6B is not improved in the early state of engine operation.

In the case of the line E where the volume of the exhaust chamber 10A is small, the rate of increase in the catalyst temperature is higher than that in the case where the volume is larger, but the unburned HC and combustion gas remaining in the exhaust chamber 10A are not satisfactorily mixed with each other because of the small volume of the chamber 10A, resulting in reduced efficiency in the re-combustion of the unburned HC, and increased discharged amount of unburned HC at the outlet of the exhaust manifold.

FIG. 9 shows the relationship between the ratio α, indicative of the volume of the exhaust chamber 10A, and the discharged amount of unburned HC over the whole operating period of the engine, namely, form the time when the engine makes a cold start, to the time when the vehicle runs in a certain running mode. Namely, FIG. 9 shows the relationship between the volume of the exhaust chamber 10A, as represented by the ratio α of the volume of the exhaust chamber to the displacement of the engine, and the integrated discharged amount of unburned HC measured at the outlet of the tail pipe after the vehicle is driven for a certain period of time.

As shown in FIG. 9, if the value of a becomes smaller than 0.5 or larger than 1.0, the integrated HC value at the tail pipe is rapidly increased. It is, therefore, found appropriate to set the volume of the exhaust chamber 10A to be in the range of about 0.5 to 1.0 times as large as the displacement of the engine (α=0.5–1.0) to limit the integrated discharged amount of unburned HC to a sufficiently low value. In the in-cylinder injection type of the present embodiment, therefore, the volume of the exhaust chamber 10A is set to be about 0.5 to 1.0 times as large as the engine displacement. To more strictly restrict the discharge of unburned HC, the value of the ratio α is desirably set to be in the range of about 0.6 to 0.9, or about 0.7 to 0.8. While the setting range of the ratio α may provide one basis on which the discharge amount of HC is determined, the above range is not critical, but may be slightly changed depending upon the type of engine or catalyst, target level of discharged HC, and so forth.

The operation of the in-cylinder injection type internal combustion engine constructed as described above according to the first embodiment of the present invention is performed in the following manner, when the engine starts operating in a cold state.

Upon the start of the engine, the operating mode selecting device 24 of the ECU 20 selects the late-period injection mode so that the engine performs a lean-burn operation, utilizing stratified charge combustion to improve fuel economy. In response to the selection by the operating mode selecting device 24, the normal fuel injection control unit 26 applies a fuel injection signal to the injector 8 so that the injector 8 injects fuel for main combustion in the latter half of the compression stroke.

The injector 8 injects the fuel directly into the combustion chamber 1 for main combustion while the fuel injection signal is being applied thereto. The fuel directly injected from the injector 8 is concentrated only in the vicinity of the spark plug 7 located at the top, central part of the combustion chamber 1, in the presence of vertical swirl (reverse tumble flow) produced by the intake air sucked from the intake port 12.

In the last period of the compression stroke, in which the fuel injection from the injector 8 is finished, the ignition timing control device 28 supplies an ignition signal to the spark plug 7, so that the spark plug 7 ignites the air/fuel mixture in the combustion chamber 1. The mixture ignited by the spark plug 7 undergoes stratified charge extreme-lean combustion. The pressure in the combustion chamber 1 is increased by this main combustion and pushes down the piston 9, to thus produce an engine torque as an output to be transmitted through the crankshaft.

During the above operation, if the temperature Tc (catalyst temperature) of the exhaust purifying device 6 that is detected by the catalyst temperature sensor 15 is lower than a predetermined temperature Tc0, the additional fuel injection control unit 27 supplies an additional fuel injection signal to the injector 8 during the middle period of the expansion stroke (where crank angle is preferably 90°±30°) of after the middle period. In response to the additional fuel injection signal, the injector 8 injects additional fuel directly into the combustion chamber 1. The additional fuel injected from the injector 8 is ignited through the low-temperature oxidizing reaction during the expansion stroke, without being ignited by the spark plug 7, and burns at a relatively low temperature as compared with the main combustion, over a period of time ranging from the latter half of the expansion stroke to the exhaust stroke, thereby increasing the temperature in the combustion chamber 1 to be higher than 1000K.

The exhaust valve 5 is opened in the last period of the expansion stroke, and high-temperature combustion gas is ejected from the combustion chamber 1 into the exhaust port 13.

At this time, part of the combustion gas has its flame extinguished while it is flowing at a high speed as blow-down gas, through the narrow exhaust passage 3 just after the exhaust valve 5 is opened, and the additional fuel that is left unburned is discharged as unburned HC into the exhaust port 13, along with the blow-down gas.

The blow-down gas, discharged from the combustion chamber 1, flows through the exhaust port 13 into the exhaust manifold 10, and unburned HC, discharged along with the blow-down gas, loses its speed and direction, because of interference with other exhaust gases and differential pressures due to exhaust pulsation. As a result, the unburned HC forms various types of flow, such as swirl flow, and remains in the exhaust chamber 10A.

Then, exhaust gases subsequently discharged from the same cylinder and those from other cylinders that meet at the joining portion 10b flow continuously into the exhaust chamber 10A, and the unburned HC remaining in the exhaust chamber 10A is mixed with these exhaust gases. In some of the exhaust gases, part of the additional fuel injected during the expansion stroke is still burning without being extinguished, and the unburned HC remaining in the exhaust chamber 10 is mixed with the exhaust gas that is still burning, and starts re-burning.

If additional unburned HC flows into the exhaust chamber 10, already in the burning condition due to re-combustion of the existing HC, the newly introduced HC also starts re-burning. Thus, unburned HC flowing into the exhaust chamber 10A burns due to a chain reaction created in the chamber 10A, thus keeping the inside of the exhaust chamber 10 in the burning condition all the time. The temperature of the exhaust gas is increased to an even higher level due to the combustion of the unburned HC.

The exhaust gas, whose temperature has been increased by the expansion stroke injection, is discharged from the combustion chamber, into the exhaust manifold 10 in which its temperature is further increased due to re-combustion of unburned HC, and then supplied to the catalysts 6A, 6B of the exhaust purifying device 6 to increase the temperature at the center of the catalysts 6A, 6B. When the temperature (catalyst temperature) Tc in the exhaust purifying device 6, detected by the catalyst temperature sensor 15, exceeds the predetermined temperature Tc0, the additional fuel injection control unit 27 judges that the catalysts 6A, 6B are in the activated states, and stops the expansion-stroke injection.

As described above, when the center temperature of the catalysts 6A, 6B, detected by the catalyst temperature sensor 15, is lower than the activation temperature, the additional fuel injection control unit 27 performs additional fuel injection during the middle period of the expansion stroke (where the crank angle is 90°±30°) or after the middle period, separately from the fuel injection for main combustion. The additional fuel, thus injected, is ignited through the low-temperature oxidizing reaction during the expansion stroke, and thus the temperature of the combustion gas that has been lowered in the expansion stroke can be increased again. The resulting high-temperature combustion gas is supplied to the catalysts 6A, 6B, so that the catalysts 6A, 6B can be advantageously activated in the early stage of engine operation.

A part of the combustion gas has its flame extinguished while it is flowing at a high rate as blow-down gas, through the narrow exhaust passage 3 between the combustion chamber 1 and the exhaust port 13 just after the exhaust valve 5 is opened, and the additional fuel that is left unburned is discharged as unburned HC, along with the blow-down gas. Since the exhaust manifold 10 is provided with the exhaust chamber 10A, the unburned HC flowing into the manifold 10 can remain or stay in the exhaust chamber 10A, and mixed with the exhaust gas that is still burning in this chamber 10A, for re-combustion of the unburned HC.

Owing to the re-combustion of unburned HC in the exhaust chamber 10A, the concentration of unburned HC in the exhaust gas can significantly reduced, thus making it possible to solve a conventional problem, namely, to significantly reduce discharge of unburned HC into the atmosphere until the catalysts 6A, 6B become activated. The present embodiment has another advantage that soot, in addition to unburned HC, can be burned by surrounding high-temperature exhaust gas, and thus the amount of soot contained in the exhaust gas can be significantly reduced.

The re-combustion of unburned HC in the exhaust chamber 10A also gives rise to a further increase in the temperature of the exhaust gas that has been increased by the additional fuel injection in the middle period of the expansion stroke. This advantageously accelerates warm-up of the catalysts 6B, 6B, and further expedites their activation. This also eliminates a need to install a catalyst adjacent the exhaust manifold, which is difficult in terms of heat, or a need to provide an expensive electrically heated catalyst. Thus, only the known exhaust purifying device (underfloor catalyst) may be used to accomplish a desired exhaust purifying function.

In the present embodiment, in particular, the in-cylinder injection type engine is constructed such that the volume of the exhaust chamber 10A is set to within the range of about 0.5 to 1.0 times as large as the displacement of the engine. When the engine starts operating in a cold state, therefore, unburned HC that remains in the exhaust chamber 10A is mixed with the combustion gas, and caused to re-burn with a high efficiency, so that discharge of the unburned HC can be significantly reduced. Furthermore, the catalyst temperature is prevented from being lowered below the activation temperature. Thus, discharge of unburned HC can be reduced to the minimum level over the whole operating period of the engine ranging from the cold start to the normal operation.

In the in-cylinder injection type engine of the present embodiment, the exhaust manifold 10 has the shape of a clamshell that is formed by attaching front and rear members together, and the exhaust chamber 10 is provided by the joining portion, in which gas flowing from a plurality of cylinders meet or join together. Thus, the exhaust manifold 10 can be easily manufactured at a relatively low cost, to provide the above-described effects.

The shape of the exhaust manifold 10, as illustrated in FIG. 4 and FIG. 1, is just an example, and the exhaust manifold 10 may be formed in other shape provided that the exhaust gases flowing from the exhaust ports 13 form turbulent flow, and remain in the exhaust chamber 10A. For example, the exhaust manifold of the in-cylender injection type engine may be constructed as illustrated in the second and third embodiments as described below.

Figure 12A:
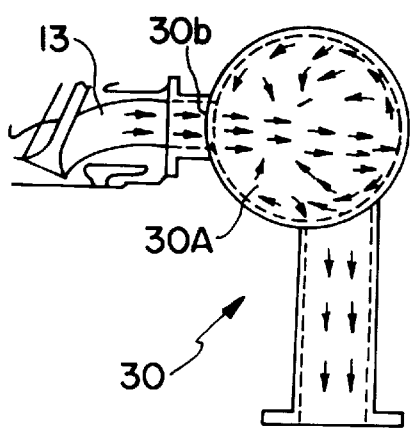
FIG. 12 ($a$) and FIG. 12($b$) are schematic views showing flow of exhaust gases in an exhaust manifold of an in-cylinder injection type internal combustion engine according to the second embodiment of the present invention, wherein FIG. 12($a$) is a view showing flow of the exhaust gases as viewed from one side face of the manifold, and FIG. 12($b$) is a view showing flow of the exhaust gases as viewed from the front side of the manifold.
Figure 12B:
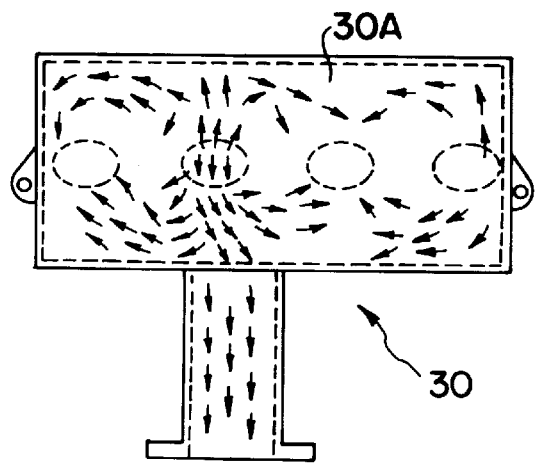

The construction of the exhaust manifold of the in-cylinder injection type engine, according to the second embodiment, will be now described. As shown in FIG. 12(*a*) and FIG. 12(*b*), the exhaust manifold 30 includes an exhaust chamber 30A having a cylindrical shape, and an upstream joining portion 30*b* is connected or joined to the middle part of the side face of the cylindrical exhaust chamber 30A as viewed in the vertical direction in FIG. 12(*a*). With the exhaust chamber 30A thus shaped, an exhaust gas flows from the upstream joining portion 30*b* into the exhaust chamber 30A in the diametrical direction of the chamber 30A, and then collide with the inner wall opposite to the upstream joining portion 30*b*. After colliding with the inner wall of the exhaust chamber 30A, the exhaust gas turns along the upper wall or lower wall of the chamber 30A to form swirl flow that diffuses in the longitudinal direction of the cylinder, and thus remains in the exhaust chamber 30A. The volume of the exhaust chamber 30A is desirably set to be about 0.5 to 1.0 times as large as the engine displacement, as in the first embodiment.

In the in-cylinder injection type engine of the second embodiment having the exhaust manifold 30 constructed as described above, the blow-down gas ejected from the exhaust port 13 of each cylinder initially flows from the upstream joining portion 30*b* into the exhaust chamber 30A in the diametrical direction of the exhaust chamber 30A, and then collide at right angles with the inner wall opposite to the upstream joining portion 30*b*. Due to the collision, unburned HC discharged along with the blow-down gas loses its original speed and direction, and turns along the upper wall or lower wall of the chamber 30A to form swirl flow that diffuses in the longitudinal direction of the cylinder. In this manner, the unburned HC remains in the exhaust chamber 30A.

As in the exhaust manifold 10 of the first embodiment, the unburned HC, that remains in the exhaust chamber 30A is mixed with the exhaust gas that is still burning, so that the unburned HC can be re-burned in the presence of the burning gas. Further, the blow-down gas flowing into the exhaust chamber 30A collides with the inner wall of the chamber at right angles, and therefore the unburned HC speeds down to a great extent and tends to remain in the exhaust chamber 30A. Also, the volume of the exhaust chamber 30 of the second embodiment is set to be larger than that of the exhaust chamber 10A of the first embodiment, and unburned HC is advantageously prevented from passing through the exhaust manifold 30, along with the blow-down gas.

Figure 13A:
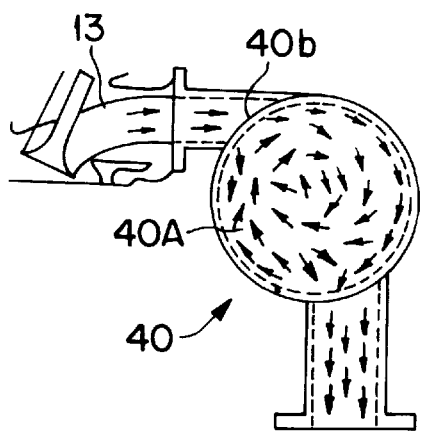
FIG. 13($a$) and FIG. 13($b$) are schematic views showing flow of exhaust gases in an exhaust manifold of an in-cylinder injection type internal combustion engine according to the third embodiment of the present invention, wherein FIG. 13($a$) is a view showing flow of the exhaust gases as viewed from one side face of the manifold, and FIG. 13($b$) is a view showing flow of the exhaust gases as viewed from the front side of the manifold.
Figure 13B:
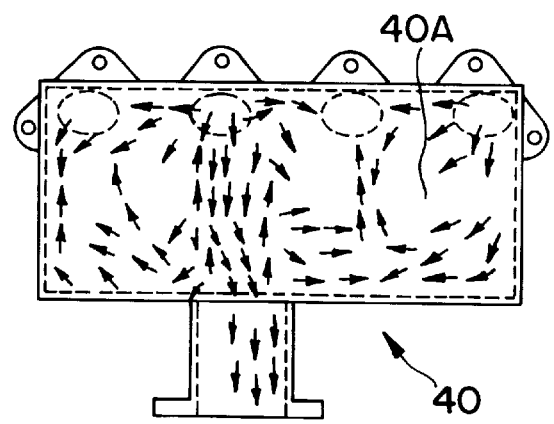

Next, the exhaust manifold of the in-cylinder injection type engine, according to the third embodiment of the invention, will be described. As shown in FIGS. 13(*a*) and 13(*b*), the exhaust manifold 40 includes an exhaust chamber 40A having a cylindrical shape, similar to the exhaust manifold 30 of the second embodiment, and its upstream joining portion 40b is joined to the upper part of the side face of the cylindrical exhaust chamber 40A as viewed in the vertical direction in FIG. 13(a). With this arrangement, an exhaust gas that flows into the exhaust chamber 40A turns along the inner wall of the exhaust chamber 40A in the circumferential direction, to form swirl flow that diffuses in the longitudinal direction of the cylinder, and thus remains in the exhaust chamber 40A. The volume of the exhaust chamber 40A is desirably set to be about 0.5 to 1.0 times as large as the engine displacement as in the first embodiment.

In the in-cylinder injection type engine of the third embodiment having the exhaust manifold 40 constructed as described above, blow-down gas that flows from the exhaust port 13 of each cylinder into the exhaust chamber 40A of the exhaust manifold 40 turns along the inner wall of the exhaust chamber 40A in the circumferential direction, to form swirl flow that diffuses in the longitudinal direction of the cylinder, and unburned HC discharged along with the blow-down gas remains in the exhaust chamber 40A.

As in the exhaust manifold 10 of the first embodiment and the exhaust manifold 30 of the second embodiment, the unburned HC that remains in the exhaust chamber 40A is mixed with exhaust gas that is still burning, so that the unburned HC is re-burned. Further, since the unburned HC in the exhaust chamber 40A, which turns along the inner wall in the circumferential direction to form swirl flow, remains uniformly in the exhaust chamber 40A, the unburned HC is advantageously mixed with the burning exhaust gas with even higher efficiency.

In the fourth embodiment of the present invention as described below, an exhaust manifold includes a known pipe-connection type manifold, and a joining portion connected to the downstream end of this manifold, and a front catalyst is provided in the joining portion. The exhaust manifold includes an exhaust chamber provided in the joining portion, to be located upstream of the front catalyst.

Figure 14A:
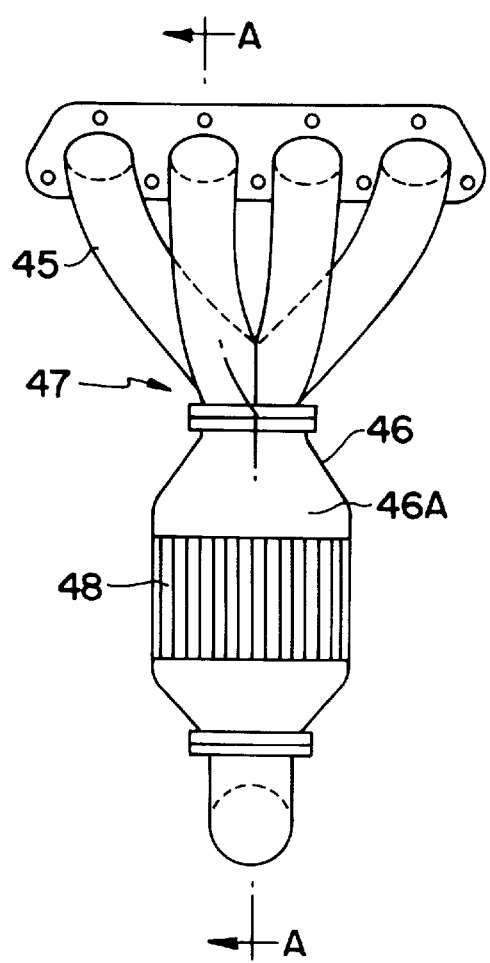
FIG. 14($a$) and FIG. 14($b$) are schematic views showing the construction of an exhaust manifold of an in-cylinder injection type internal combustion engine according to the fourth embodiment of the present invention, wherein FIG. 14($a$) is a front view of the exhaust manifold, and FIG. 14($b$) is a side view showing the exhaust manifold in cross section.
Figure 14B:
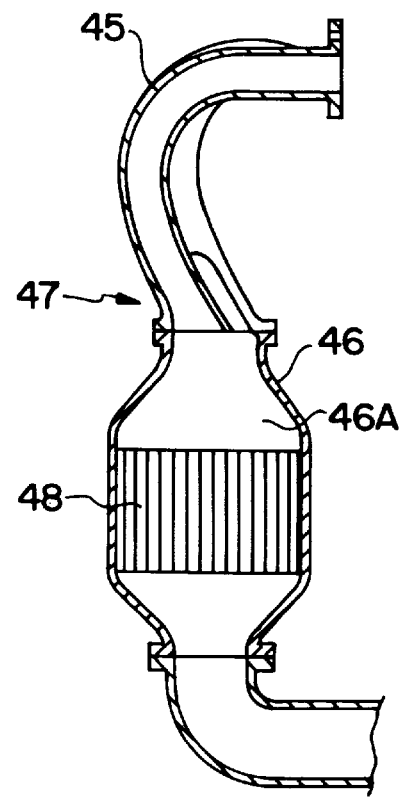

The construction of the in-cylinder injection type engine according to the fourth embodiment of the present invention will be described in detail. As shown in FIG. 14(a) and FIG. 14(b), an exhaust manifold 47 of the present embodiment has an exhaust manifold body (pipe-connection type manifold) 45, and a joining portion 46 having a large-diameter middle portion and located downstream of the exhaust manifold body 45. A FCC (front catalyst) 48 is provided in the joining portion 46, and an exhaust chamber 46A with an expanded volume is formed upstream of the FCC 48 within the joining portion 46. In operation, unburned HC is re-burned in the exhaust chamber 46A.

Since the unburned HC re-burns just upstream of the FCC 48, exhaust gas that has re-burned immediately reaches the catalyst, with a reduced loss of thermal energy due to heat dissipation to the outside, resulting in an increase in the thermal energy that can be used for increasing the temperature of the FCC 48. Consequently, the discharged amount of unburned HC can be reduced due to re-combustion thereof, and at the same time the FCC 48 can be activated in the early stage of engine operation.

Figure 11A:
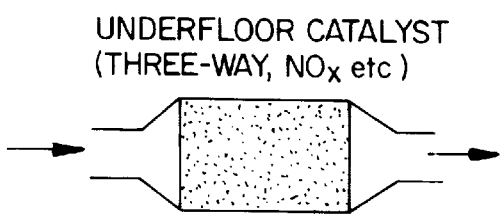
FIG. 11($a$) through FIG. 11($d$) are views showing various arrangements of catalysts in the in-cylinder injection type engine of the first embodiment of the present invention.
Figure 11B:
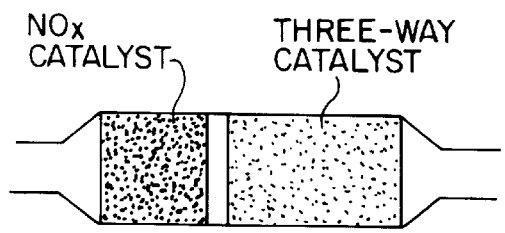
Figure 11C:
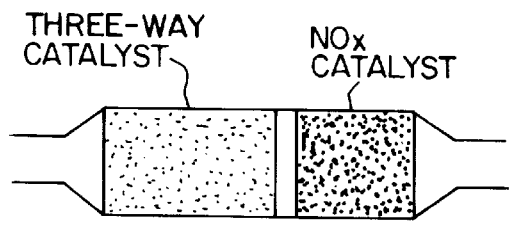
Figure 11D:
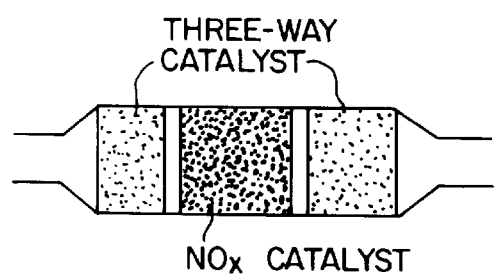

In the meantime, the structure of the exhaust purifying device (underfloor catalyst) is not limited to that of FIG. 2, in which the NOx catalyst 6A is disposed in the front or upstream portion of the device, and the three-way catalyst 6B is disposed in the rear or downstream portion of the device. For example, the exhaust purifying device may be constructed as shown in FIG. 11(a) to FIG. 11(d), depending upon NOx adsorption and release characteristics of the NOx catalyst. As shown in FIG. 11(a), the exhaust purifying device may include one catalyst having the functions of both of NOx catalyst and three-way catalyst. In the example of FIG. 11(c), a three-way catalyst is located in the front part (upstream side) of the exhaust purifying device, and a NOx catalyst is located in the rear part (downstream side) of the device. In the example of FIG. 11(d), two three-way catalysts may be provided upstream and downstream of a NOx catalyst. The arrangement as shown in FIG. 11(b) is identical with that of FIG. 2.

Figure 15A:
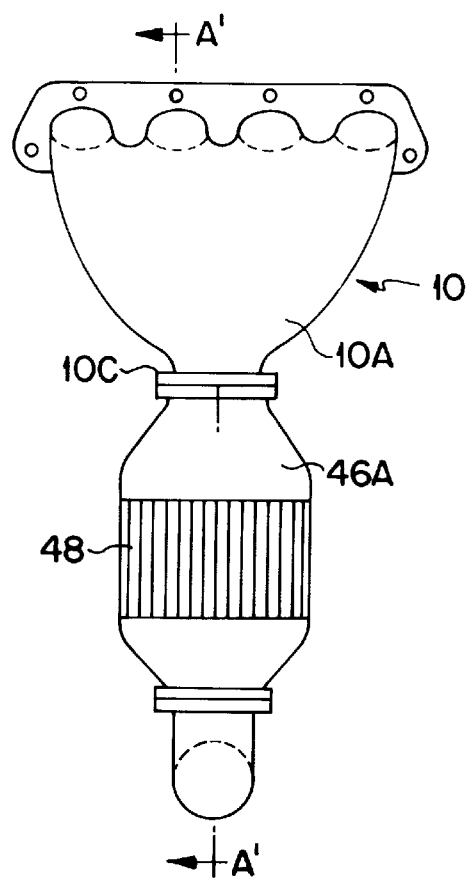
FIG. 15 ($a$) and FIG. 15($b$) are schematic views showing the construction of a modified example of the exhaust manifold of the in-cylinder injection type engine according to the first embodiment of the present invention, wherein FIG. 15($a$) is a front view of the exhaust manifold, and FIG. 15($b$) is a side view showing the exhaust manifold in cross section.
Figure 15B:
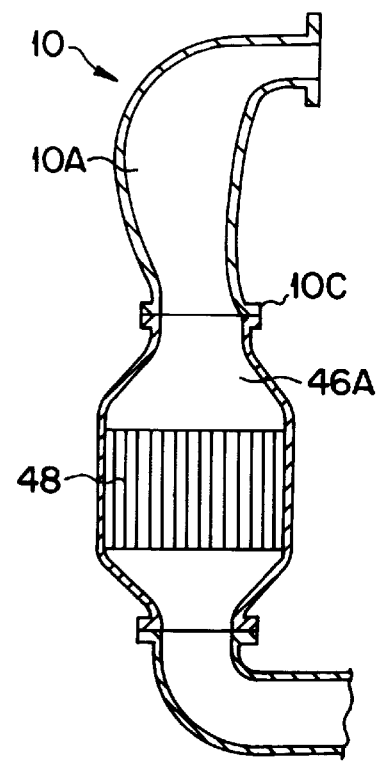
Figure 16:
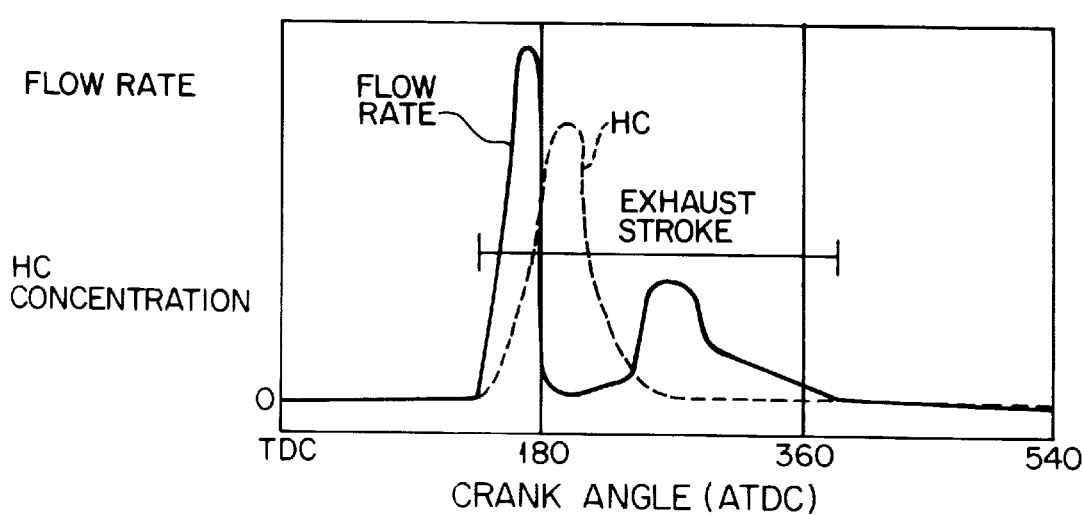
FIG. 16 is a graph showing the flow rate of exhaust gas that flows out of a combustion chamber, and the concentration of unburned HC, in relation to the crank angle.

In each of the in-cylinder injection type engines of the first to third embodiments, a front catalyst may be provided downstream of the exhaust manifold, as in the fourth embodiment. FIG. 15 shows one example in which the FCC (front catalyst) 48 is connected to the manifold outlet 10c of the exhaust manifold 10 of the first embodiment. In this example, the distance between the downstream joining portion 10d and the outlet 10c of the exhaust manifold 10, namely, the length of the collecting portion 10C, is shortened (in FIG. 15, the distance is substantially 0), so that the exhaust chamber 10A of the exhaust manifold 10 cooperates with the exhaust chamber 46A on the upstream side of the FCC 48 to form a single exhaust chamber. In this case, the unburned HC remains in the exhaust chamber for a prolonged period of time, to be well mixed with exhaust gas for better reaction, which leads to further reduction in the unburned HC and early activation of the FCC 48.

It is to be understood that the present invention is not limited to the illustrated embodiments, but may be otherwise embodied with various other changes or modifications, without departing from the principle of the present invention. While series four-cylinder engines are employed in the illustrated embodiments, the present invention may be applied to other types of multi-cylinder engines. Where a V-type engine (such as V-type six cylinder) is employed, for example, the exhaust manifold having the exhaust chamber, as described above, may be provided for each bank (including three cylinders, out of the six cylinders formed in V-type).

The engine displacement that provides a basis on which the volume of the exhaust chamber is determined is the sum of displacements of cylinders that are covered by each exhaust manifold. Where only one exhaust manifold is provided as in a series four-cylinder engine, the engine displacement is the sum of displacements of all of the cylinders. Where the exhaust manifold is provided for each bank as in a V-type six-cylinder engine, the engine displacement is the sum of displacement of cylinders included in each bank (the sum of displacements of three cylinders in the case of the V-type six-cylinder engine).

What is claimed is:

1. An in-cylinder injection type internal combustion engine including a fuel injector that injects fuel directly into a combustion chamber, comprising:

a catalyst that purifies exhaust gas discharged from the combustion chamber;

a fuel injection control device that controls the fuel injected from the fuel injector, said fuel injection control device having a main fuel injection control unit and an additional fuel injection control unit, said main fuel injection control unit driving the fuel injector to inject fuel that is to be subjected to premixed combustion or stratified charge combustion, depending upon operating conditions of the engine, said additional fuel injection control unit driving the fuel injector to inject additional fuel during one of a middle period and after the middle period of an expansion stroke after the fuel injector is driven by said main fuel injection control unit to generate a combustion gas that contains unburned HC when a temperature of said catalyst needs to be increased; and an exhaust manifold provided between the combustion chamber and the catalyst, said exhaust manifold having a manifold inlet connected to an exhaust port of the engine, and a manifold outlet connected to an inlet side of the catalyst, said exhaust manifold forming an exhaust chamber that interferes with the flow of the exhaust gas discharged from the combustion chamber to momentarily maintain the discharged exhaust gas in the exhaust chamber and burn the unburned HC therein to heat the catalyst.

2. An in-cylinder injection type internal combustion engine as defined in claim 1, wherein said exhaust manifold allows unburned HC to re-burn in said exhaust chamber by the additional fuel injection, said exhaust chamber having a volume that is determined to prevent a reduction in a temperature of the exhaust gas after the additional fuel injection.

3. An in-cylinder injection type internal combustion engine as defined in claim 1, wherein said exhaust chamber of said exhaust manifold has a total volume set to within a range of about 0.5 to 1.0 times as large as a total displacement of the internal combustion engine.

4. An in-cylinder injection type internal combustion engine as defined in claim 3, further comprising:

a plurality of cylinders divided into a plurality of cylinder groups, wherein said exhaust chamber of the exhaust manifold for each of said plurality of cylinder groups has a volume of about 0.5 to 1.0 times as large as a displacement of each of said plurality of cylinder groups.

5. An in-cylinder injection type internal combustion engine as defined in claim 3, wherein said exhaust chamber of said exhaust manifold has a total volume set to within a range of about 0.6 to 0.9 times as large as a total displacement of the internal combustion engine.

6. The in-cylinder injection type internal combustion engine according to claim 1, wherein said exhaust chamber is provided in a joining portion of manifold branches.

7. A method of controlling an in-cylinder injection type internal combustion engine including a fuel injector that injects fuel directly into a combustion chamber, wherein the internal combustion engine includes a catalyst that purifies exhaust gas discharged from the combustion chamber, a fuel injection control device that controls the fuel injected from the fuel injector, and an exhaust manifold provided between the combustion chamber and the catalyst, comprising:

providing an exhaust chamber in the exhaust manifold that interferes with a flow of exhaust gas from the combustion chamber to momentarily maintain the discharged exhaust gas therein;

performing main fuel injection control for driving the fuel injector to inject the fuel to be subjected to pre-mixed combustion or stratified charge combustion, depending upon operating conditions of the engine;

performing additional fuel injection control for driving the fuel injector to inject additional fuel during one of a middle period and after the middle period of an expansion stroke after the main fuel injection control is performed to generate the combustion gas containing unburned HC when a temperature of the catalyst needs to be increased;

providing the generated combustion gas into the exhaust gas chamber to burn the unburned HC therein to heat the catalyst.

8. The method controlling an in-cylinder injection type internal combustion engine according to claim 7, wherein said exhaust chamber is provided in a joining portion of manifold branches.

9. An in-cylinder injection type internal combustion engine, comprising:

a catalyst provided in an exhaust passage of the engine;

at least one combustion chamber, each combustion chamber having a fuel injector adapted to inject fuel directly therein;

a main fuel injection control unit adapted to control the fuel injector to inject main fuel mainly during at least one of a suction stroke and a compression stroke, a combustion of the main fuel generating hydro carbon gas;

an additional fuel injection control unit adapted to control the fuel injector to inject additional fuel, after ignition of said main fuel, mainly during one of a middle period and after the middle period of an expansion stroke, to generate an exhaust gas containing unburned HC, when a temperature of said catalyst needs to be increased; and a secondary combustion chamber provided in an exhaust manifold disposed upstream of the catalyst, said secondary combustion chamber interfering with the flow of the generated exhaust gas from the combustion chamber to momentarily maintain the discharged exhaust gas in the secondary combustion chamber and burn the unburned HC therein to heat the catalyst.

10. The in-cylinder injection type internal combustion engine according to claim 9, wherein a capacity of said secondary combustion chamber is equal to or smaller than a total displacement of said at least one combustion chamber.

11. The in-cylinder injection type internal combustion engine according to claim 9, wherein said at least one combustion chamber includes a plurality of combustion chambers, and secondary combustion chamber mixes the hydro carbon gas generated in each of said plurality of combustion chambers.

12. The in-cylinder injection type internal combustion engine according to claim 9, wherein said secondary combustion chamber is provided within an exhaust manifold.

13. The in-cylinder injection type internal combustion engine according to claim 9, wherein said secondary combustion chamber is provided between an exhaust manifold and a catalytic converter.

14. A method of raising temperature of exhaust gas in an in-cylinder injection type internal combustion engine comprising:

providing a catalyst in an exhaust passage of the engine;

providing a secondary combustion chamber in an exhaust manifold disposed upstream of the catalyst, said secondary combustion chamber interfering with a flow of the generated exhaust gas from the combustion chamber to momentarily maintain the discharged exhaust gas in the secondary combustion chamber;

injecting main fuel directly into a combustion chamber mainly during at least one of a suction stroke and a compression stroke;

igniting said main fuel to generate hydrocarbon gas;

injecting additional fuel, after ignition of said main fuel, mainly during one of a middle period and after the middle period of an expansion stroke, to generate an exhaust gas containing unburned hydro carbon gas and high temperature combustion gas, when a temperature of said catalyst needs to be increased; and providing the hydro carbon gas and the high temperature exhaust gas into a secondary combustion chamber, such that the hydro carbon gas is combusted by the high temperature exhaust gas to increase temperature of an exhaust gas exhausted from the secondary combustion chamber to heat the catalyst.

* * * * *